United States Patent
Maeda et al.

(10) Patent No.: US 9,802,463 B2
(45) Date of Patent: Oct. 31, 2017

(54) VEHICULAR AIR-CONDITIONING UNIT

(71) Applicant: DENSO CORPORATION, Kariya, Aichi-pref. (JP)

(72) Inventors: Kenichiro Maeda, Kariya (JP); Shinya Kato, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 58 days.

(21) Appl. No.: 15/021,761

(22) PCT Filed: Sep. 1, 2014

(86) PCT No.: PCT/JP2014/004466
§ 371 (c)(1),
(2) Date: Mar. 14, 2016

(87) PCT Pub. No.: WO2015/040803
PCT Pub. Date: Mar. 26, 2015

(65) Prior Publication Data
US 2016/0229266 A1    Aug. 11, 2016

(30) Foreign Application Priority Data
Sep. 18, 2013  (JP) .................. 2013-193027

(51) Int. Cl.
| F25D 17/04 | (2006.01) |
| B60H 1/00 | (2006.01) |
| B60H 1/32 | (2006.01) |

(52) U.S. Cl.
CPC ......... *B60H 1/3227* (2013.01); *B60H 1/0005* (2013.01); *B60H 1/00678* (2013.01);
(Continued)

(58) Field of Classification Search
CPC ............ B60H 1/3227; B60H 1/0005; B60H 1/00678; B60H 1/00842; B60H 1/00849;
(Continued)

(56) References Cited

U.S. PATENT DOCUMENTS 2,355,151 A * 8/1944 Findley .............. B60H 1/00042
454/121
2,817,282 A * 12/1957 Dolison ............... B60H 1/3229
454/139
(Continued)

FOREIGN PATENT DOCUMENTS

JP    H09277816 A    10/1997
JP    2004352085 A    12/2004
(Continued)

OTHER PUBLICATIONS

International Search Report and Written Opinion (in Japanese with English Translation) for PCT/JP2014/004466, dated Dec. 2, 2014; ISA/JP.

*Primary Examiner* — Ljiljana Ciric
(74) *Attorney, Agent, or Firm* — Harness, Dickey & Pierce, P.L.C.

(57) ABSTRACT

A vehicular air-conditioning unit has an air-conditioning case, a first ventilation passage and a second ventilation passage, a first communication-ventilation passage defined in the air-conditioning case, the first communication-ventilation passage through which one end of the first ventilation passage communicates with one end of the second ventilation passage, a first heat exchanger that heats or cools air flowing in the first ventilation passage, a second heat exchanger that heats or cools air flowing in the second ventilation passage, and a blowing mode switching device setting any one of blowing modes. The blowing modes include (i) a first blowing mode in which air is blown into a vehicle compartment after flowing through the first ven-
(Continued)

tilation passage and in which air is blown into the vehicle compartment after flowing through the second ventilation passage and (ii) a second blowing mode in which air flows into the second ventilation passage through the first communication-ventilation passage after flowing through the first ventilation passage and is blown into the vehicle compartment.

13 Claims, 10 Drawing Sheets

(52) U.S. Cl.
CPC ..... *B60H 1/00842* (2013.01); *B60H 1/00849* (2013.01); *B60H 2001/00085* (2013.01); *B60H 2001/00092* (2013.01); *B60H 2001/00107* (2013.01); *B60H 2001/00135* (2013.01); *B60H 2001/00721* (2013.01)

(58) Field of Classification Search
CPC .. B60H 2001/0085; B60H 2001/00092; B60H 2001/00107; B60H 2001/00135; B60H 2001/00721
USPC .............. 62/186; 165/202, 203, 204; 454/75
See application file for complete search history.

(56) References Cited

U.S. PATENT DOCUMENTS

| | | | | |
|---|---|---|---|---|
| 4,460,035 A * | 7/1984 | Mizote | B60H 1/00864 | 165/202 |
| 4,537,245 A * | 8/1985 | Nishimura | B60H 1/00842 | 165/203 |
| 4,562,954 A * | 1/1986 | Kajita | B60H 1/00842 | 165/42 |
| 4,721,032 A * | 1/1988 | Sakamoto | B60H 1/0055 | 454/146 |
| 4,874,036 A * | 10/1989 | Masuda | B60H 1/00378 | 165/124 |
| 4,917,293 A * | 4/1990 | Fedter | B60H 1/00785 | 165/202 |
| 4,996,849 A * | 3/1991 | Burst | B60H 1/00842 | 165/202 |
| 5,222,372 A * | 6/1993 | DeRees | B60H 1/0005 | 62/237 |
| 5,341,652 A * | 8/1994 | Tajiri | B60H 1/0005 | 165/42 |
| 5,390,728 A * | 2/1995 | Ban | B60H 1/00742 | 165/202 |
| 5,447,469 A * | 9/1995 | Dausch | B60H 1/00057 | 165/42 |
| 5,564,493 A * | 10/1996 | Kato | B60H 1/00735 | 165/263 |
| 5,582,234 A * | 12/1996 | Samukawa | B60H 1/00828 | 165/204 |
| 5,590,540 A * | 1/1997 | Ikeda | B60H 1/00735 | 236/49.3 |
| 5,607,105 A * | 3/1997 | Samukawa | B60H 1/00735 | 165/203 |
| 5,642,856 A * | 7/1997 | Samukawa | B60H 1/00864 | 165/203 |
| 5,681,218 A * | 10/1997 | Kishi | B60H 3/0085 | 454/139 |
| 5,706,667 A * | 1/1998 | Iritani | B60H 1/00828 | 165/244 |
| 5,720,181 A | 2/1998 | Karl et al. | | |
| 5,934,988 A * | 8/1999 | Fischer | B60H 1/00028 | 454/121 |
| 6,012,297 A * | 1/2000 | Ichishi | B60H 1/00871 | 165/203 |
| 6,244,335 B1 * | 6/2001 | Nakamura | B60H 1/00028 | 165/203 |
| 6,308,770 B1 * | 10/2001 | Shikata | B60H 1/00064 | 165/126 |
| 6,332,497 B1 * | 12/2001 | Niwa | B60H 1/00007 | 165/204 |
| 6,367,270 B2 * | 4/2002 | Niimi | B60H 1/3208 | 62/133 |
| 6,371,202 B1 * | 4/2002 | Takano | B60H 1/00914 | 165/202 |
| 6,431,267 B1 * | 8/2002 | Tanaka | B60H 1/00064 | 165/204 |
| 6,463,998 B1 * | 10/2002 | Shindo | B60H 1/00028 | 165/204 |
| 6,554,695 B2 * | 4/2003 | Elliot | B60H 1/00028 | 454/139 |
| 6,622,787 B1 * | 9/2003 | Toyoshima | B60H 1/00064 | 165/203 |
| 6,718,783 B2 * | 4/2004 | Ohga | B60H 1/00971 | 165/202 |
| 6,796,894 B1 * | 9/2004 | Matsuno | B60H 1/242 | 165/41 |
| 6,871,696 B2 * | 3/2005 | Aoki | B60H 1/00285 | 165/203 |
| 6,923,012 B2 * | 8/2005 | Kurata | B60H 1/00735 | 165/203 |
| 7,140,427 B2 * | 11/2006 | Honda | B60H 1/00907 | 165/202 |
| 7,152,417 B2 * | 12/2006 | Morishita | B60H 1/00278 | 62/186 |
| 7,171,821 B2 * | 2/2007 | Yoong | F24F 13/12 | 236/49.3 |
| 7,174,733 B2 * | 2/2007 | Oomura | B60H 1/3216 | 310/54 |
| 7,222,666 B2 * | 5/2007 | Homan | B60H 1/3207 | 165/202 |
| 7,404,435 B2 * | 7/2008 | Samukawa | B60H 1/00842 | 165/202 |
| 8,079,405 B2 * | 12/2011 | Shindoh | B60H 1/00028 | 165/202 |
| 8,109,108 B2 * | 2/2012 | Nagayama | B60H 1/00835 | 165/204 |
| 8,301,335 B2 * | 10/2012 | Hill | G05B 13/021 | 165/202 |
| 8,527,095 B2 * | 9/2013 | Kikuchi | B60H 1/00278 | 165/121 |
| 8,540,014 B2 * | 9/2013 | Chikagawa | B60H 1/00028 | 165/200 |
| 8,702,482 B2 * | 4/2014 | Helt | F24F 11/0001 | 236/49.3 |
| 8,899,311 B2 * | 12/2014 | Misumi | B60H 1/00742 | 165/202 |
| 2002/0036081 A1 * | 3/2002 | Ito | B60H 1/00828 | 165/202 |
| 2002/0129932 A1 * | 9/2002 | Nagata | B60H 1/00028 | 165/202 |
| 2003/0046943 A1 * | 3/2003 | Takano | B60H 1/3207 | 62/186 |
| 2003/0051869 A1 * | 3/2003 | Inoue | B60H 1/00885 | 165/203 |
| 2003/0056529 A1 * | 3/2003 | Kakehashi | B60H 1/3225 | 62/186 |
| 2004/0074244 A1 * | 4/2004 | Ichishi | B60H 1/00742 | 62/186 |
| 2004/0103679 A1 * | 6/2004 | Ichishi | B60H 1/00271 | 62/244 |
| 2004/0129007 A1 * | 7/2004 | Tomita | B60H 1/00064 | 62/157 |
| 2004/0194913 A1 * | 10/2004 | Umebayashi | B60H 1/00692 | 165/42 |
| 2004/0200611 A1 * | 10/2004 | Tamatsu | B60H 1/00007 | 165/203 |
| 2004/0244961 A1 | 12/2004 | Han | | |
| 2006/0030253 A1 * | 2/2006 | Asai | B60H 1/008 | 454/75 |
| 2006/0080986 A1 * | 4/2006 | Inoue | B60H 1/00057 | 62/259.2 |

(56) References Cited

U.S. PATENT DOCUMENTS

| | | | | |
|---|---|---|---|---|
| 2006/0270333 A1* | 11/2006 | Hirai | B60H 1/00849 | 454/75 |
| 2007/0144727 A1* | 6/2007 | Hirayama | B60H 1/0005 | 165/203 |
| 2008/0066480 A1* | 3/2008 | Kamiyama | B60H 1/00271 | 62/244 |
| 2008/0248736 A1* | 10/2008 | Aoki | B60H 1/00742 | 454/75 |
| 2008/0256966 A1* | 10/2008 | Kawashima | B60H 1/00842 | 62/239 |
| 2009/0013706 A1* | 1/2009 | Sato | B60H 1/00664 | 62/239 |
| 2009/0229788 A1* | 9/2009 | Chikagawa | B60H 1/00028 | 165/61 |
| 2010/0116485 A1* | 5/2010 | Hiyama | B60H 1/00271 | 165/202 |
| 2010/0241308 A1* | 9/2010 | Kikuchi | B60H 1/00278 | 701/36 |
| 2011/0136424 A1* | 6/2011 | Park | B60H 1/00278 | 454/75 |
| 2011/0162409 A1* | 7/2011 | Okumura | B60H 1/00842 | 62/498 |
| 2012/0205088 A1* | 8/2012 | Morisita | B60H 1/00921 | 165/202 |
| 2012/0241126 A1 | 9/2012 | Kishi | | |
| 2013/0068440 A1* | 3/2013 | Kamiyama | B60H 1/00849 | 165/202 |
| 2014/0080398 A1* | 3/2014 | Tabei | B60H 1/00785 | 454/75 |
| 2014/0116076 A1* | 5/2014 | Kato | B60H 1/3205 | 62/186 |
| 2014/0261308 A1* | 9/2014 | Miyagawa | F02B 77/11 | 123/320 |
| 2014/0335774 A1* | 11/2014 | Dorland | B60H 1/00685 | 454/139 |
| 2015/0056906 A1* | 2/2015 | Fujii | B60N 2/5628 | 454/75 |
| 2015/0118946 A1* | 4/2015 | Yeon | B60H 1/00764 | 454/75 |
| 2015/0122472 A1* | 5/2015 | Higuchi | B60H 1/00849 | 165/202 |
| 2015/0165866 A1* | 6/2015 | Kim | B60H 1/00807 | 165/11.1 |
| 2015/0183291 A1* | 7/2015 | Higuchi | B60H 1/00785 | 62/133 |
| 2015/0239322 A1* | 8/2015 | Yokoo | F25B 5/04 | 62/158 |
| 2015/0336439 A1* | 11/2015 | Wang | B60H 1/00064 | 165/203 |
| 2016/0043669 A1* | 2/2016 | Fukuda | H02P 5/68 | 318/562 |
| 2016/0075212 A1* | 3/2016 | Morishita | F25B 41/04 | 165/202 |
| 2016/0144685 A1* | 5/2016 | Ochiai | B60H 1/00064 | 165/204 |
| 2016/0288609 A1* | 10/2016 | Yamaoka | B60H 1/00021 | |
| 2017/0008372 A1* | 1/2017 | Kato | B60H 1/0055 | |
| 2017/0129312 A1* | 5/2017 | Kato | B60H 1/3414 | |

FOREIGN PATENT DOCUMENTS

| | | |
|---|---|---|
| JP | 3614058 B2 | 1/2005 |
| JP | 2011057080 A | 3/2011 |
| JP | 2012201236 A | 10/2012 |

* cited by examiner

VEHICULAR AIR-CONDITIONING UNIT

CROSS REFERENCE TO RELATED APPLICATIONS

This application is a U.S. National Phase Application under 35 U.S.C. 371 of International Application No. PCT/JP2014/004466 filed on Sep. 1, 2014 and published in Japanese as WO 2015/040803 A1 on Mar. 26, 2015. This application is based on and claims the benefit of priority from Japanese Patent Application No. 2013-193027 filed on Sep. 18, 2013. The entire disclosures of all of the above applications are incorporated herein by reference.

TECHNICAL FIELD

The present disclosure relates to a vehicular air-conditioning unit having two ventilation passages arranged in parallel with each other.

BACKGROUND ART

A conventional technique regarding an air conditioner for a vehicle is disclosed in, for example, Patent Literature 1. An air conditioner for a vehicle disclosed in Patent Literature 1 has an air-conditioning case and an evaporator that is a heat exchanger and disposed in the air-conditioning case. A heat exchanging portion of the evaporator is divided into a first portion and a second portion. A conditioned air flowing in the air-conditioning case flows in the first portion of the evaporator, further flows in the second portion of the evaporator, and is blown into a vehicle compartment subsequently. Thus, by introducing the conditioned air to pass through the evaporator twice in the air-conditioning case, air that is blown into the vehicle compartment can be cooled effectively as compared to a case where the air is introduced to pass the evaporator once.

PRIOR ART LITERATURES

Patent Literature

Patent Literature 1: US 2004/0244961 A1

SUMMARY OF INVENTION

As Patent Literature 1, a temperature adjustment of the conditioned air can be performed effectively by introducing a conditioned air to pass through a heat exchanger twice in an air-conditioning case. On the other hand, by introducing the conditioned air to pass through the heat exchanger twice, a pressure loss increases as compared to a case where the conditioned air passes through the heat exchanger once. Accordingly, there may be a possibility of being difficult to ventilate the conditioned air in a large volume. Further, for keeping a passenger's comfort as well as possible, an increase of air volume blown into the vehicle compartment may be accorded priority over a decrease of a temperature of air blown into the vehicle compartment. For example, when a temperature in the vehicle compartment is extremely high, air blown into the vehicle compartment is required to be increased in volume than to be decreased in temperature.

Therefore, the passenger's comfort may be spoiled by the air conditioner for a vehicle of patent literature 1 since the air volume that is blown into the vehicle compartment cannot be increased enough.

It is an objective of the present disclosure to provide a vehicular air-conditioning unit with which an air temperature can be adjusted effectively by introducing air to pass through a heat exchanger twice in an air-conditioning case and with which a decrease of pressure loss due to an air flow in the air-conditioning case can be accorded priority over introducing the air to pass through the heat exchanger twice.

A vehicular air-conditioning unit of the present disclosure has an air-conditioning case, a first ventilation passage and a second ventilation passage defined in parallel with each other in the air-conditioning case, a first communication-ventilation passage defined in the air-conditioning case, the first communication-ventilation passage through which one end of the first ventilation passage communicates with one end of the second ventilation passage, a first heat exchanger that is disposed in the first ventilation passage and heats or cools air flowing in the first ventilation passage between the one end and an other end of the first ventilation passage, a second heat exchanger that is disposed in the second ventilation passage and heats or cools air that flows in the second ventilation passage between the one end and an other end of the second ventilation passage, and a blowing mode switching device setting any one of blowing modes.

The blowing modes include (i) a first blowing mode in which air is introduced from outside of the air-conditioning case to the one end of the first ventilation passage, the air flows from the one end to the other end of the first ventilation passage, and the air is blown into a vehicle compartment from the other end of the first ventilation passage, and in which air is introduced from outside of the air-conditioning case to the one end of the second ventilation passage, the air flows from the one end to the other end of the second ventilation passage, and the air is blown into the vehicle compartment from the other end of the second ventilation passage and (ii) a second blowing mode in which air is introduced from outside of the air-conditioning case to the other end of the first ventilation passage, the air flows from the other end to the one end of the first ventilation passage and flows to the one end of the second ventilation passage through the first communication-ventilation passage, the air flowing to the one end of the second ventilation passage flows from the one end of the second ventilation passage to the other end of the second ventilation passage, and the air is blown from the other end of the second ventilation passage into the vehicle compartment.

As described above, in the second blowing mode, air introduced to the other end of the first ventilation passage from outside of the air-conditioning case flows to the one end of the second ventilation passage through the communication-ventilation passage after flowing from the other end to the one end of the first ventilation passage. The air flowing to the one end of the second ventilation passage flows from the one end of the second ventilation passage to the other end of the second ventilation passage and is blown from the other end of the second ventilation passage into the vehicle compartment. Accordingly, the air introduced into the air-conditioning case is blown into the vehicle compartment after flowing sequentially through the first heat exchanger and the second heat exchanger. Thus, an air temperature can be adjusted effectively by introducing air to pass through the heat exchanger twice in the air-conditioning case.

Moreover, in the first blowing mode, (i) air, which is introduced to the one end of the first ventilation passage from outside of the air-conditioning case, flows from the one end to the other end of the first ventilation passage and is blown into a vehicle compartment from the other end of the first ventilation passage, and (ii) air, which is introduced to the one end of the second ventilation passage from outside of the air-conditioning case, flows from the one end to the other end of the second ventilation passage and is blown into the vehicle compartment from the other end of the second ventilation passage. Accordingly, air introduced into the air-conditioning case is blown into the vehicle compartment after passing one of the first heat exchanger and the second heat exchanger and without passing the other one. Thus, in the first blowing mode, a pressure loss due to an airflow in the air-conditioning case can be reduced as compared to the second blowing mode in which air passes through the heat exchanger twice in the air-conditioning case.

DESCRIPTION OF EMBODIMENTS

Embodiments of the present disclosure will be described hereafter referring to drawings.

In the embodiments, a part that corresponds to a matter described in a preceding embodiment may be assigned with the same reference number, and redundant explanation for the part may be omitted.

First Embodiment

Figure 1:
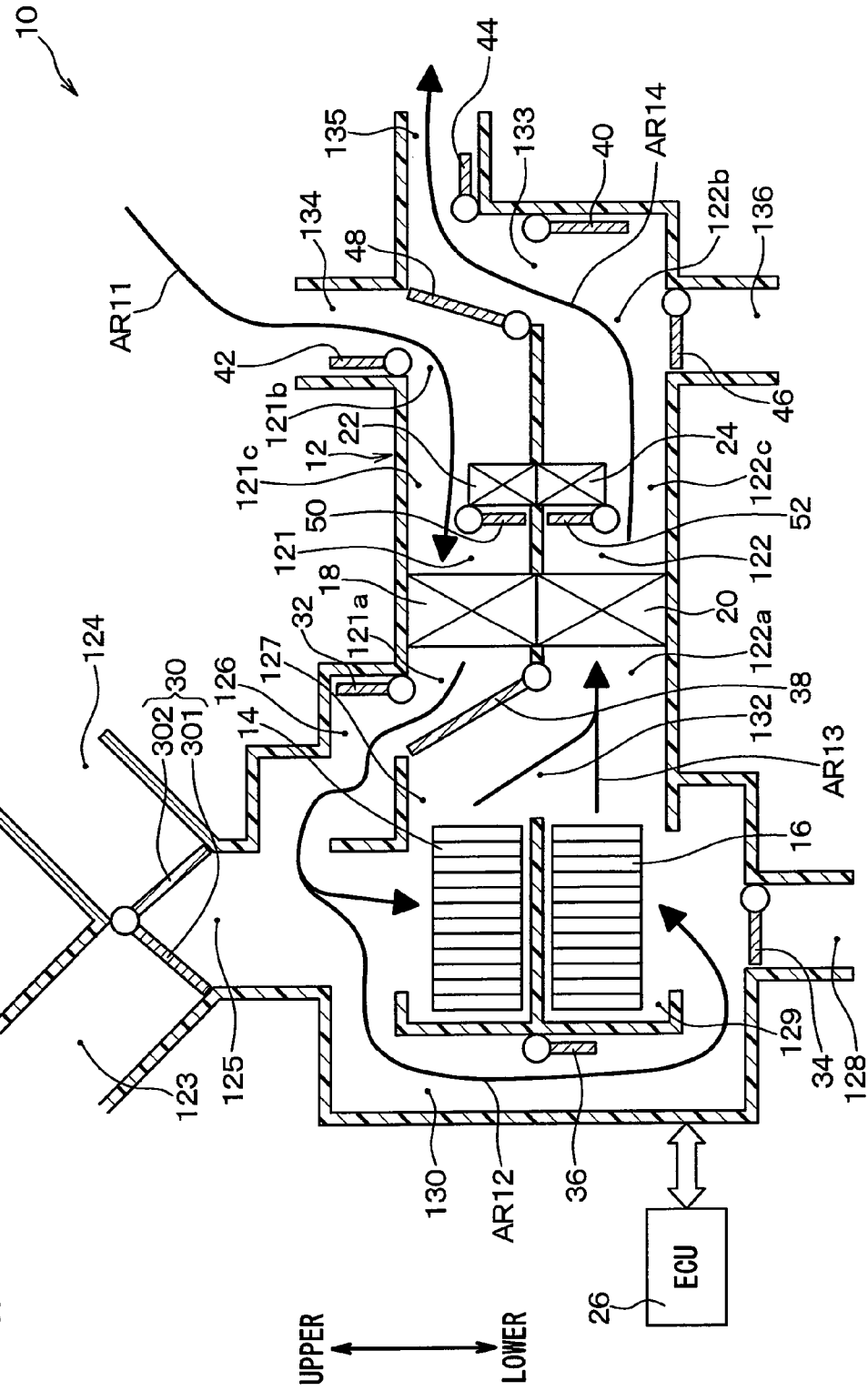
FIG. 1 is a schematic sectional view illustrating a vehicular air-conditioning unit 10 according to a first embodiment and is a diagram showing an air flow in an air-conditioning case 12 in a double-cooling cooling mode.

FIG. 1 is a schematic sectional view illustrating a vehicular air-conditioning unit 10 of the present embodiment. The vehicular air-conditioning unit 10 (referred to as an air-conditioning unit 10 hereafter) is disposed in a front area in a vehicle compartment. The air-conditioning unit 10 constitutes, for example, a part of an air conditioner for a vehicle provided with a refrigeration cycle that has a compressor and a condenser disposed in an engine room. An arrow showing an upper-lower direction in FIG. 1 shows an upper-lower direction on a condition where the air-conditioning unit 10 is disposed in the vehicle. Hereafter, a vehicle upper-lower direction that is the upper-lower direction on the condition of being disposed in the vehicle will be referred to as an upper-lower direction, and a direction perpendicular to the vehicle upper-lower direction will be referred to as a horizontal direction.

As shown in FIG. 1, the air-conditioning unit 10 has an air-conditioning case 12, a first blower 14, a second blower 16, a first evaporator 18, a second evaporator 20, a first heater core 22, a second heater core 24, doors for switching airflows in the air-conditioning case 12, and an electric control unit (hereafter referred to as an ECU) 26.

The air-conditioning case 12 defines an air passage therein and constitutes a housing of the air-conditioning unit 10. The air-conditioning case 12 is made of resin or the like. As shown in FIG. 1, the air-conditioning case 12 has a first ventilation passage 121, a second ventilation passage 122, an outside-air introducing port 123, a first inside-air introducing port 124, an intake portion 125, a circular ventilation passage 126, a first-blower housing portion 127, a second inside-air introducing port 128, a second-blower housing portion 129, a first communication-ventilation passage 130, a second communication-ventilation passage 132, a third communication-ventilation passage 133, a first blowing outlet 134, a second blowing outlet 135, and a third blowing outlet 136.

The first ventilation passage 121 and the second ventilation passage 122 extend to ventilate air in the horizontal direction and are defined in parallel with each other. The first ventilation passage 121 is located above the second ventilation passage 122 in the upper-lower direction.

The outside-air introducing port 123 communicates with a space outside of the vehicle compartment through an outside-air inlet and a duct that are disposed in a vehicle body and are not shown. The first inside-air introducing port 124 communicates with an inside of the vehicle compartment through a duct that is not shown. Both the outside-air introducing port 123 and a first inside-air introducing port 124 are connected the intake portion 125 in the air-conditioning case 12. That is, the outside-air introducing port 123, the first inside-air introducing port 124, and the intake portion 125, as a whole, constitute an air introducing portion introducing air from outside of the air-conditioning case 12.

When an inside-outside air switching door 30, which is constituted by a first door 301 and a second door 302, rotates, the outside-air introducing port 123 and the first inside-air introducing port 124 are open or closed respectively. The first door 301 and the second door 302 rotate integrally. The inside-outside air switching door 30 rotates to a position such as a first switching position, a second switching position, or a third switching position. When the inside-outside air switching door 30 is set to the first switching position, the first door 301 closes the outside-air introducing port 123, and the second door 302 closes the first inside-air introducing port 124. When the inside-outside air switching door 30 is set to the second switching position, the outside-air introducing port 123 is open, and the first door 301 closes the first inside-air introducing port 124. When the inside-outside air switching door 30 is set to the third switching position, the second door 302 closes the outside-air introducing port 123, and the first inside-air introducing port 124 is open. That is, an air introduction from outside of the air-conditioning case 12 through the air introducing portion is blocked when the inside-outside air switching door 30 is set to the first switching position, an outside air at outside of the vehicle compartment is introduced through the air introducing portion when the inside-outside air switching door 30 is set to the second switching position, and inside air that is in the vehicle compartment is introduced through the air introducing portion when the inside-outside air switching door 30 is set to the third switching position.

The circular ventilation passage 126 connects a one end 121a of the first ventilation passage 121 and the intake portion 125 to each other. The circular ventilation passage 126 has a circular-ventilation-passage door 32, and the circular-ventilation-passage door 32 rotates to open or close the circular ventilation passage 126.

The first-blower housing portion 127 houses the first blower 14. The first-blower housing portion 127 is connected to the one end 121a of the first ventilation passage 121 on an air-blowing side of the first blower 14 and is connected to the intake portion 125 on an air-suction side of the first blower 14.

The second inside-air introducing port 128 communicates with the inside of the vehicle compartment through a duct that is not shown. A second inside-air door 34 is disposed in the second inside-air introducing port 128, and the second inside-air door 34 rotates to open or close the second inside-air introducing port 128.

The second-blower housing portion 129 houses the second blower 16. The second-blower housing portion 129 connects to a one end 122a of the second ventilation passage 122 on an air-blowing side of the second blower 16 and connects to the second inside-air introducing port 128 and the first communication-ventilation passage 130 on an air-suction side of the second blower 16.

The first communication-ventilation passage 130 is connected to the intake portion 125 at one end of the first communication-ventilation passage 130. That is, the one end of the first communication-ventilation passage 130 is connected to the one end 121a of the first ventilation passage 121 through the intake portion 125 and the circular ventilation passage 126.

The first communication-ventilation passage 130 is connected to the second-blower housing portion 129 at the other end of the first communication-ventilation passage 130. That is, the other end of the first communication-ventilation passage 130 is connected to the one end 122a of the second ventilation passage 122 through the second-blower housing portion 129. Thus, the first communication-ventilation passage 130 is a ventilation passage through which the one end 121a of the first ventilation passage 121 and the one end 122a of the second ventilation passage 122 communicate with each other.

A first communication-ventilation-passage door 36 is disposed in the first communication-ventilation passage 130. The first communication-ventilation-passage door 36 rotates to open or close the first communication-ventilation passage 130.

Figure 2:
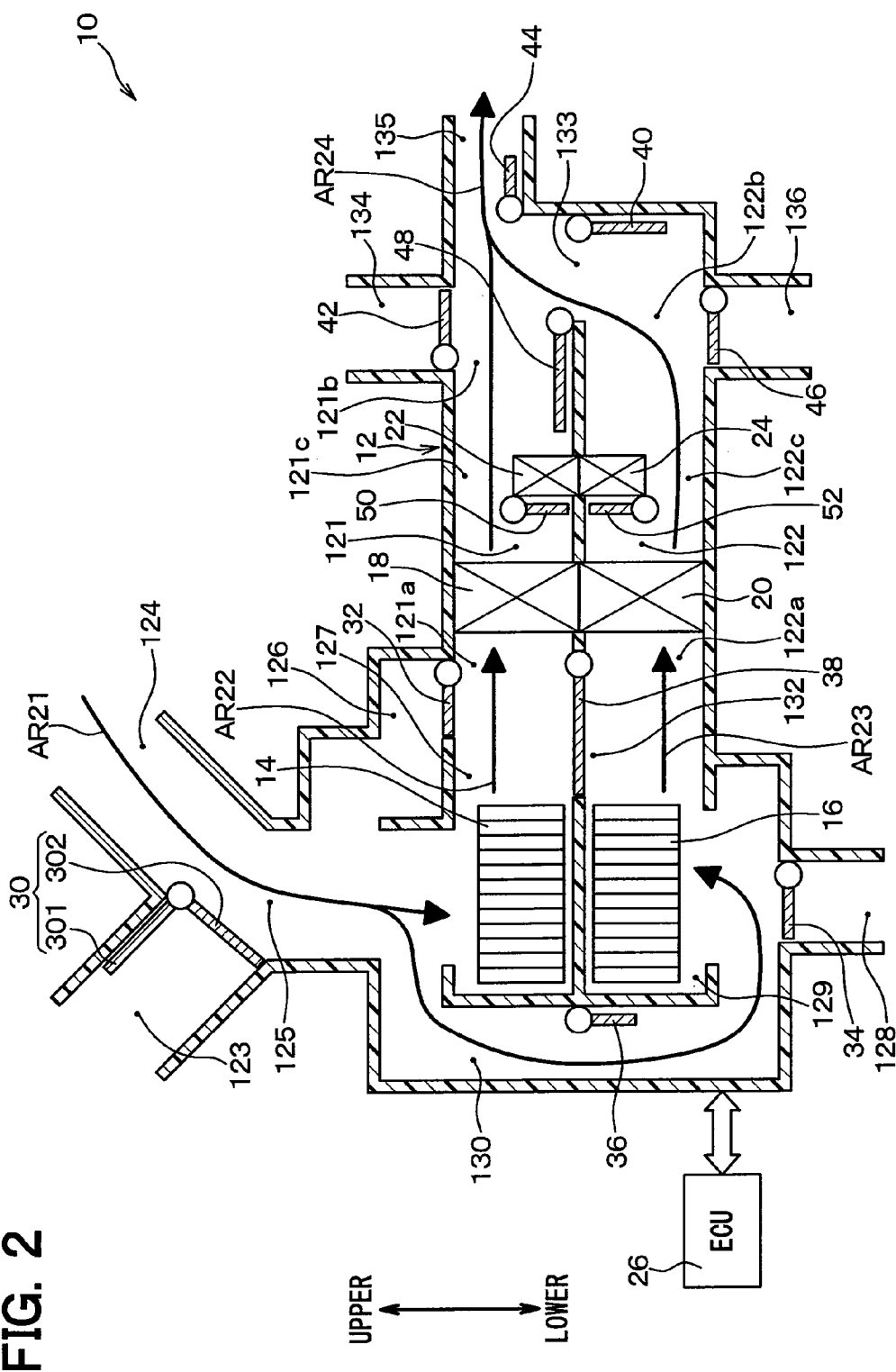
FIG. 2 is a schematic sectional view illustrating the vehicular air-conditioning unit 10 shown in FIG. 1 and is a diagram showing an air flow in the air-conditioning case 12 in a single-cooling cooling mode.

The second communication-ventilation passage 132 is a ventilation passage through which the first-blower housing portion 127 and the one end 122a of the second ventilation passage 122 communicate with each other. A second communication-ventilation-passage door 38 is disposed in the second communication-ventilation passage 132. The second communication-ventilation-passage door 38 rotates and is set to one of two communicating positions. At a first communicating position, as shown in FIG. 1, the second communication-ventilation-passage door 38 blocks a communication between the one end 121a of the first ventilation passage 121 and the first-blower housing portion 127 and open the second communication-ventilation passage 132. At a second communicating position, as shown in FIG. 2 described after, the one end 121a of the first ventilation passage 121 and the first-blower housing portion 127 communicate with each other, and the second communication-ventilation-passage door 38 closes the second communication-ventilation passage 132. Thus, the second communication-ventilation-passage door 38 functions as a switching portion that sets alternatively between the second communication-ventilation passage 132 and the first ventilation passage 121 as a target to which the first blower 14 blows air by being rotated to the first communicating position or the second communicating position.

The third communication-ventilation passage 133 shown in FIG. 1 is a ventilation passage through which the other end 122b of the second ventilation passage 122 to each of the other end 121b of the first ventilation passage 121, the first blowing outlet 134, and the second blowing outlet 135. A third communication-ventilation-passage door 40 is disposed in the third communication-ventilation passage 133. The third communication-ventilation-passage door 40 rotates to open or close the third communication-ventilation passage 133.

The first blowing outlet 134 is connected to a blowing outlet that is defined around a bottom end of a windshield of the vehicle in the vehicle compartment through a duct that is not shown. That is, the first blowing outlet 134 is a defroster outlet for blowing air toward the windshield. The first blowing outlet 134 is connected to the other end 121b of the first ventilation passage 121 in the air-conditioning case 12. A first blowing door 42 is disposed in the first blowing outlet 134. The first blowing door 42 rotates to open or close the first blowing outlet 134.

The second blowing outlet 135 is connected to blowing outlets through a duct that is not shown. The blowing outlets are defined on each of an upper side of a center portion of a dashboard that is disposed in the vehicle compartment and an upper side of both ends of the dashboard in a lateral direction through a duct that is not shown. That is, the second blowing outlet 135 is a face outlet for blowing air toward an upper body including a face of a seating passenger in the vehicle compartment. The second blowing outlet 135 is connected to the other end 121b of the first ventilation passage 121 in the air-conditioning case 12. The second blowing outlet 135 is connected to the other end 122b of the second ventilation passage 122 through the third communication-ventilation passage 133. A second blowing door 44 is disposed in the second blowing outlet 135. The second blowing door 44 rotates to open or close the second blowing outlet 135.

The third blowing outlet 136 is connected to a blowing outlet that is defined on a lower area in the vehicle compartment. That is, the third blowing outlet 136 is a foot outlet for blowing air toward a foot of a passenger having a seat in the vehicle compartment, in other words, toward a foot of the seating passenger. The third blowing outlet 136 is connected to the other end 122b of the second ventilation passage 122 in the air-conditioning case 12. A third blowing door 46 is disposed in the third blowing outlet 136. The third blowing door 46 rotates to open or close the third blowing outlet 136.

In the air-conditioning case 12, a middle-mode door 48 is disposed in the other end 121b of the first ventilation passage 121, and the middle-mode door 48 is positioned at any one of two middle mode positions. In a first middle-mode position, as shown in FIG. 1, the middle-mode door 48 blocks a communication between the other end 121b of the first ventilation passage 121 and the second blowing outlet 135 while keeping the other end 121b of the first ventilation passage 121 and the first blowing outlet 134 to connect to each other. In this case, the other end 122b of the second ventilation passage 122 is connected to the second blowing outlet 135 when the third communication-ventilation passage 133 is open by the third communication-ventilation-passage door 40.

In a second middle-mode position that is one of the two middle mode positions, as shown in FIG. 2 described after, the middle-mode door 48 is positioned to connect the other end 121b of the first ventilation passage 121 to the first blowing outlet 134 and the second blowing outlet 135. In this case, the other end 122b of the second ventilation passage 122 is connected to the other end 121b of the first ventilation passage 121 and the first blowing outlet 134 when the third communication-ventilation passage 133 is open by the third communication-ventilation-passage door 40.

The first blower 14 is a centrifugal electric blower. A fan, in other words, a blowing impeller, of the first blower 14 is housed in the first-blower housing portion 127. The first blower 14 draws air from the intake portion 125 and blows the air to the one end 121a of the first ventilation passage 121 or the one end 122a of the second ventilation passage 122 depending on a position of the second communication-ventilation-passage door 38.

The second blower 16 is also a centrifugal electric blower, and a blowing impeller of the second blower 16 is housed in the second-blower housing portion 129. The second blower 16 draws air from the first communication-ventilation passage 130 or the second inside-air introducing port 128 and blows the air to the one end 122a of the second ventilation passage 122.

The first evaporator 18 is disposed in the first ventilation passage 121 between the one end 121a and the other end 121b of the first ventilation passage 121 and located entirely in cross section of the first ventilation passage 121 such that all air flowing in the first ventilation passage 121 pass through the first evaporator 18. The first evaporator 18 is a cooling heat exchanger in which air flowing in the first ventilation passage 121 is cooled by a heat exchange performed between the air and refrigerant flowing in the first evaporator 18. The first evaporator 18 corresponds to a first heat exchanger of the present disclosure.

The second evaporator 20 is disposed in the second ventilation passage 122 between the one end 122a and the other end 122b of the second ventilation passage 122 and located in entire cross section of the second ventilation passage 122 such that all air flowing in the second ventilation passage 122 pass through the second evaporator 20. The second evaporator 20 is a cooling heat exchanger in which air flowing in the second ventilation passage 122 is cooled by a heat exchange performed between the air and refrigerant flowing in the second evaporator 20. The second evaporator 20 corresponds to a second heat exchanger of the present disclosure.

The first evaporator 18 and the second evaporator 20 constitute a single heat exchanger as a whole, and an air passage of the single heat exchanger is divided by a partition plate to suppress a mixing of air passing the first evaporator 18 and air passing the second evaporator 20.

The first heater core 22 is a heating heat exchanger in which air passing through the first heater core 22 is heated by a heat exchange performed between the air and an engine cooling water that is a warm water flowing in the first heater core 22. The first heater core 22 is disposed between the first evaporator 18 and the other end 121b of the first ventilation passage 121 in the first ventilation passage 121. The first ventilation passage 121 has a first bypass passage 121c through which air flows between the first evaporator 18 and the other end 121b of the first ventilation passage 121 while bypassing the first heater core 22.

A first air-mix door 50 is disposed between the first evaporator 18 and the first heater core 22 in the first ventilation passage 121. The first air-mix door 50 adjusts volume ratio between an air volume passing through the first heater core 22 and an air volume passing through the first bypass passage 121c depending on a rotation angle of the first air-mix door 50. Specifically, the first air-mix door 50 rotates between a max-cool position where an airflow to the first heater core 22 is blocked, and all air flows to the first bypass passage 121c and a max-hot position where an airflow to the first bypass passage 121c is blocked, and all air flows to the first heater core 22.

The second heater core 24 is a heating heat exchanger in which air passing through the second heater core 24 is heated by a heat exchange performed between the air and an engine cooling water that is a warm water flowing in the second heater core 24. The second heater core 24 is disposed between the second evaporator 20 and the other end 122b of the second ventilation passage 122 in the second ventilation passage 122. The second ventilation passage 122 has a second bypass passage 122c through which air flows between the second evaporator 20 and the other end 122b of the second ventilation passage 122 while bypassing the second heater core 24.

A second air-mix door 52 is disposed between the second evaporator 20 and the second heater core 24 in the second ventilation passage 122. The second air-mix door 52 adjusts volume ratio between an air volume passing through the second heater core 24 and an air volume passing through the second bypass passage 122c depending on a rotation angle of the second air-mix door 52. Specifically, the second air-mix door 52 rotates between a max-cool position and a max-hot position similar to the first air-mix door 50.

The first heater core 22 and the second heater core 24 constitute a single heat exchanger as a whole, and an air passage of the single heat exchanger is divided by a partition plate to suppress a mixing of air passing the first heater core 22 and air passing the second heater core 24.

The ECU 26 is constituted by a well-known microcomputer including a CPU, a ROM, a RAM, and a peripheral circuit and performs various control processing based on a computer program memorized in ROM etc. in advance.

The each door disposed in the air-conditioning case 12 is connected to an actuator operating the each door, and the ECU 26 outputs an operation signal to the actuator to rotate the door. The ECU 26 also outputs operation signals to a compressor for circulating refrigerant in the first evaporator 18 and the second evaporator 20, the first blower 14, and the second blower 16. The ECU 26, the doors switching a double-cooling cooling mode and a single-cooling cooling mode that are described after, and the actuator operating the each door correspond to a blowing-mode switching device.

The ECU 26 is connected with sensors and switches that are not shown. The switches are, for example, an inside temperature sensor, an outside temperature sensor, a temperature setting switch, a blowing-mode switching switch, and an inside-outside air-introduction switching switch. The inside temperature sensor detects a temperature of the inside air that is a temperature in the vehicle compartment. The outside temperature sensor detects a temperature of the outside air that is a temperature outside of the vehicle compartment. The temperature setting switch is operated by the passenger to set an inside temperature that the passenger require. The blowing-mode switching switch is operated by the passenger to set a blowing outlet from which air is blown into the vehicle compartment. The inside-outside air-introduction switching switch switches between inside air and outside air to be introduced. A detection signal from the inside temperature sensor, a detection signal from the outside temperature sensor, a switch operation signal from the temperature setting switch, a switch operation signal from the blowing-mode switching switch, and a switch operation signal from the inside-outside air-introduction switching switch are input to the ECU 26.

The ECU 26 performs various air conditionings by the air-conditioning unit 10. For example, the ECU 26 sets an operation state of the air-conditioning unit 10 to one of blowing modes. The blowing modes include, for example, the double-cooling cooling mode, a single-cooling cooling mode, and an inside-air/outside-air two-layer mode.

The double-cooling cooling mode will be described. The double-cooling cooling mode corresponds to a second blowing mode of the present disclosure. In the double-cooling cooling mode, the ECU 26 operates the doors to be positioned as shown in FIG. 1.

Specifically, as shown in FIG. 1, the inside-outside air switching door 30 is positioned at the first switching position to close both the outside-air introducing port 123 and the first inside-air introducing port 124. The circular-ventilation-passage door 32 opens the circular ventilation passage 126. The second inside-air door 34 closes the second inside-air introducing port 128. The first communication-ventilation-passage door 36 opens the first communication-ventilation passage 130. The second communication-ventilation-passage door 38 opens the second communication ventilation passage 132 while blocking a communication between the one end 121a of the first ventilation passage 121 and the first-blower housing portion 127. The third communication-ventilation-passage door 40 opens the third communication-ventilation passage 133. The first blowing door 42 opens the first blowing outlet 134. The second blowing door 44 opens the second blowing outlet 135. The third blowing door 46 closes the third blowing outlet 136. The middle-mode door 48 blocks a communication between the other end 121b of the first ventilation passage 121 and the second blowing outlet 135 while keeping the other end 121b of the first ventilation passage 121 and the first blowing outlet 134 to connect to each other.

FIG. 1 shows an example in which both the first air-mix door 50 and the second air-mix door 52 are rotated to the max-cool position. The higher a target blowing temperature that is a target value of a blowing temperature of conditioned air blown into the vehicle compartment, the closer the first air-mix door 50 and the second air-mix door 52 to the max-hot position by being rotated. This is also the same in FIG. 2 described after, and is the same in a second embodiment and subsequent embodiments.

The ECU 26 operates the first blower 14 and the second blower 16 and operates the first evaporator 18 and the second evaporator 20 to cool air such that a cooling operation is performed. In the double-cooling cooling mode, the first blower 14 and the second blower 16 causes a suction force with respect to the first ventilation passage 121 for drawing air flowing in the first ventilation passage 121 and causes a discharge force with respect to the second ventilation passage 122 for discharging air to the second ventilation passage 122. Accordingly, in the air-conditioning case 12, air flows as shown in FIG. 1 by arrows AR11, AR12, AR13, and AR14.

Specifically, as shown in FIG. 1, air outside of the air-conditioning case 12, in other words, air outside of the vehicle compartment, is introduced to the other end 121b of the first ventilation passage 121 from the first blowing outlet 134. The introduced air flows from the other end 121b of the first ventilation passage 121 to the one end 121a of the first ventilation passage 121 and is cooled in the first evaporator 18 along the way. The air flows from the one end 121a of the first ventilation passage 121, passes through the circular ventilation passage 126 and the intake portion 125, and is drawn into the first blower 14. The air is also drawn into the second blower 16 through the first communication-ventilation passage 130.

Air drawn into the first blower 14 is blown from the first blower 14 to the one end 122a of the second ventilation passage 122, and air drawn into the second blower 16 is blown from the second blower 16 to the one end 122a of the second ventilation passage 122. Those air are mixed at the one end 122a of the second ventilation passage 122.

Air flowing to the one end 122a of the second ventilation passage 122 flows from the one end 122a of the second ventilation passage 122 to the other end 122b of the second ventilation passage 122 and is cooled in the second evaporator 20 along the way. Air flowing to the other end 122b of the second ventilation passage 122 is blown from the other end 122b into the vehicle compartment through the third communication-ventilation passage 133 and the second blowing outlet 135. Thus, in the double-cooling cooling mode, air introduced into the air-conditioning case 12 is cooled twice by passing through the first evaporator 18 and the second evaporator 20 and is blown into the vehicle compartment.

The single-cooling cooling mode will be explained hereafter. The single-cooling cooling mode corresponds to a first blowing mode of the present disclosure. The single-cooling cooling mode is set when a large amount of air is required in the cooling operation. Accordingly, the ECU 26 sets the single-cooling cooling mode when a temperature in the vehicle compartment is higher than or equal to a predetermined temperature threshold. When a temperature in the vehicle compartment is extremely high, the passenger's comfort can be achieved more quickly by increasing an amount of air that is blown into the vehicle compartment than by decreasing temperature of the air. Conversely, the double-cooling cooling mode is set when the temperature in the vehicle compartment is lower than the temperature threshold.

In the single-cooling cooling mode, the ECU 26 operates the doors to be located at positions shown in FIG. 2. FIG. 2 is a sectional view schematically illustrating the same air-conditioning unit 10 as FIG. 1 and shows airflows in the air-conditioning case 12 in the single-cooling cooling mode.

Specifically, as shown in FIG. 2, the inside-outside air switching door 30 is located at the third switching position to close the outside-air introducing port 123 and open the first inside-air introducing port 124. The circular-ventilation-passage door 32 closes the circular ventilation passage 126. The second inside-air door 34 closes the second inside-air introducing port 128. The first communication-ventilation-passage door 36 opens the first communication-ventilation passage 130. The second communication-ventilation-passage door 38 connects the one end 121a of the first ventilation passage 121 to the first-blower housing portion 127 and closes the second communication-ventilation passage 132. The third communication-ventilation-passage door 40 opens the third communication-ventilation passage 133. The first blowing door 42 closes the first blowing outlet 134. The second blowing door 44 opens the second blowing outlet 135. The third blowing door 46 closes the third blowing outlet 136. The middle-mode door 48 connects the other end 121b of the first ventilation passage 121 to the first blowing outlet 134 and the second blowing outlet 135.

The ECU 26 operates the first blower 14 and the second blower 16 and performs the cooling operation by operating the first evaporator 18 and the second evaporator 20 to cool air. In the single-cooling cooling mode, the first blower 14 and the second blower 16 drawn air from the intake portion 125. The first blower 14 blows the air to the first ventilation passage 121, and the second blower 16 blows the air to the second ventilation passage 122. Accordingly, in the air-conditioning case 12, air flows as shown in FIG. 2 by arrows AR21, AR22, AR23, and AR24.

Specifically, as shown in FIG. 2, air outside of the air-conditioning case 12, in other words, air outside of the vehicle compartment, is introduced to the intake portion 125 from the first inside-air introducing port 124. The air introduced into the intake portion 125 is drawn into the first blower 14 and is also drawn into the second blower 16 through the first communication-ventilation passage 130.

Air drawn into the first blower 14 is blown from the first blower 14 to the one end 122a of the second ventilation passage 122 as shown by the arrow AR22. At the same time, air drawn into the second blower 16 is blown from the second blower 16 to the one end 122a of the second ventilation passage 122 as shown by the arrow AR23.

Air flowing to the one end 121a of the first ventilation passage 121 flows from the one end 121a of the first ventilation passage 121 to the other end 121b of the first ventilation passage 121 and is cooled in the first evaporator 18 along the way. The cooled air is blown from the other end 121b of the first ventilation passage 121 into the vehicle compartment through the second blowing outlet 135.

While air is flowing in the first ventilation passage 121, air flowing to the one end 122a of the second ventilation passage 122 flows from the one end 122a of the second ventilation passage 122 to the other end 122b of the second ventilation passage 122 and is cooled in the second evaporator 20 along the way. The cooled air is blown from the other end 122b of the second ventilation passage 122 to the second blowing outlet 135 and mixed with air from the first ventilation passage 121, and the mixed air is blown into the vehicle compartment through the second blowing outlet 135. Thus, in the single-cooling cooling mode, air introduced into the air-conditioning case 12 flows parallel in the first ventilation passage 121 and the second ventilation passage 122. Therefore, air flowing in the first ventilation passage 121 is blown into the vehicle compartment after being cooled once in the first evaporator 18, and air flowing in the second ventilation passage 122 is blown into the vehicle compartment after being cooled once in the second evaporator 20.

The inside-air/outside-air two-layer mode will be described hereafter. The inside-air/outside-air two-layer mode will be referred to as a two-layer mode hereafter. The two-layer mode is set when a heating operation is performed.

Figure 3:
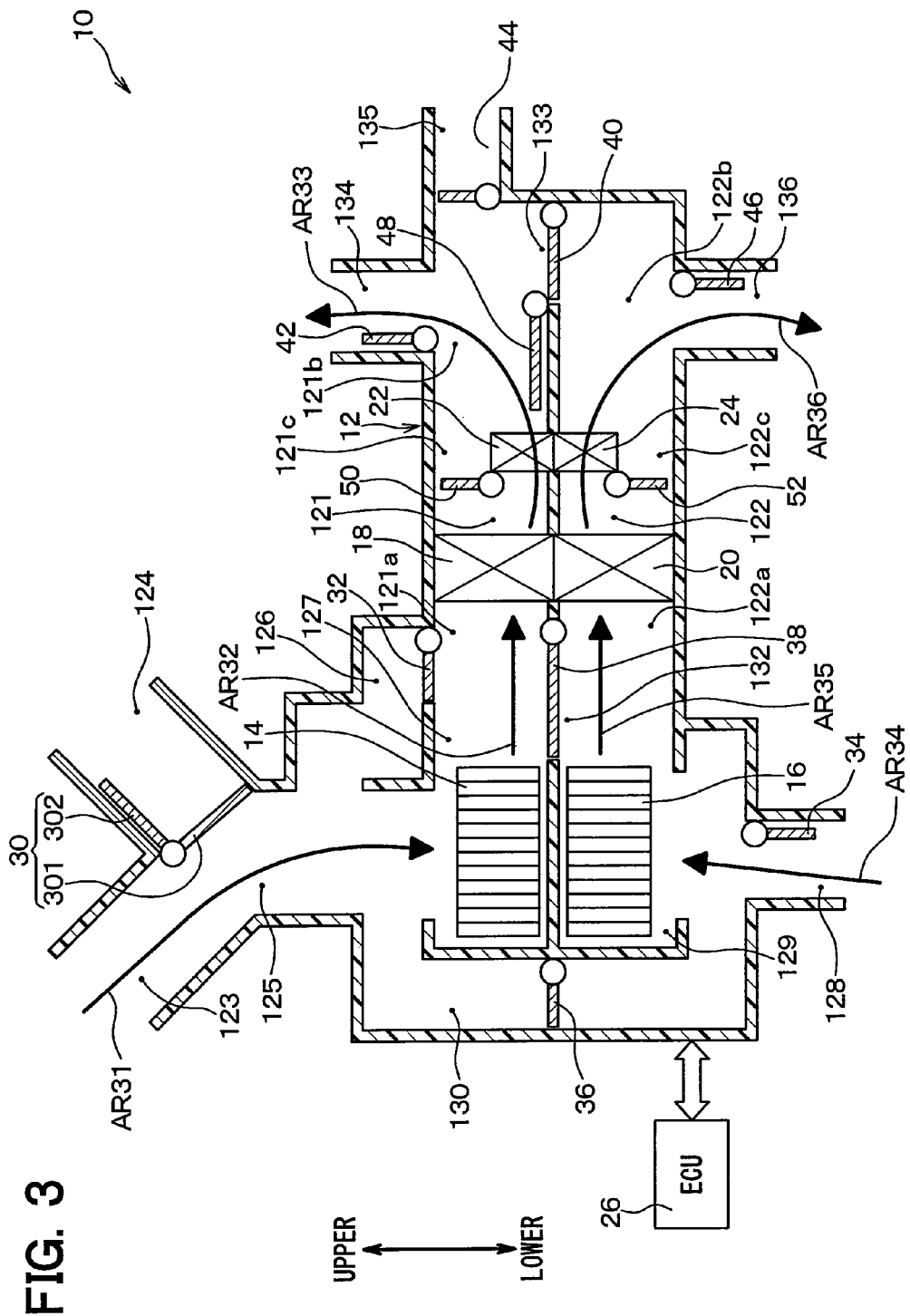
FIG. 3 is a schematic sectional view illustrating the vehicular air-conditioning unit 10 shown in FIG. 1 and is a diagram showing an air flow in the air-conditioning case 12 in inside-air/outside-air two-layer mode.

In the two-layer mode, the ECU 26 operates the doors to be positioned as shown in FIG. 3. FIG. 3 is a sectional view schematically illustrating the same air-conditioning unit 10 as FIG. 1 and shows airflows in the air-conditioning case 12 in the two-layer mode.

Specifically, as shown in FIG. 3, the inside-outside air switching door 30 is located at the second switching position to open the outside-air introducing port 123 and close the first inside-air introducing port 124. The circular-ventilation-passage door 32 closes the circular ventilation passage 126. The second inside-air door 34 opens the second inside-air introducing port 128. The first communication-ventilation-passage door 36 closes the first communication-ventilation passage 130. The second communication-ventilation-passage door 38 connects the one end 121a of the first ventilation passage 121 to the first-blower housing portion 127 and closes the second communication-ventilation passage 132. The third communication-ventilation-passage door 40 closes the third communication-ventilation passage 133. The first blowing door 42 opens the first blowing outlet 134. The second blowing door 44 closes the second blowing outlet 135. The third blowing door 46 opens the third blowing outlet 136. The middle-mode door 48 connects the other end 121b of the first ventilation passage 121 to the first blowing outlet 134 and the second blowing outlet 135.

FIG. 3, shows an example in which both the first air-mix door 50 and the second air-mix door 52 are rotated to the max-hot position. The lower the target blowing temperature of air blown into the vehicle compartment, the closer the first air-mix door 50 and the second air-mix door 52 to the max-cool position. This is also the same in the second embodiment and subsequent embodiments.

The ECU 26 operates the first blower 14 and the second blower 16 and performs the heating operation by operating the first heater core 22 and the second heater core 24 to heat air. In the two-layer mode, the first blower 14 blows air drawn from the outside-air introducing port 123 to the first ventilation passage 121. Accordingly, in the air-conditioning case 12, air flows as shown by arrows AR31, AR32, AR33, and AR34 in FIG. 3 by the first blower 14. The second blower 16 draws air from the second inside-air introducing port 128 and blows the air to the second ventilation passage 122. Accordingly, in the air-conditioning case 12, air flows as shown by arrows AR34, AR35, and AR36 in FIG. 3 by the second blower 16.

Specifically, as shown in FIG. 3, air outside of the vehicle compartment, in other words, outside air, is drawn from the outside-air introducing port 123 to the first blower 14 through the intake portion 125. The air drawn into the first blower 14 is blown from the first blower 14 to the one end 121a of the first ventilation passage 121 as shown by the arrow AR32. The air flows from the one end 121a of the first ventilation passage 121 to the other end 121b of the first ventilation passage 121 and is heated in the first heater core 22 in the first ventilation passage 121. At this time, although air that is in the first ventilation passage 121 passes through the first evaporator 18, the first evaporator 18 is on an off-condition and does not cool the air. Air flowing to the other end 121b of the first ventilation passage 121 is blown from the other end 121b of the first ventilation passage 121 into the vehicle compartment through the first blowing outlet 134.

While the air is flowing from the first blower 14, air inside of the vehicle compartment, in other words, inside air, is drawn into the second blower 16 from the second inside-air introducing port 128. Air drawn into the second blower 16 is blown to the one end 122a of the second ventilation passage 122 from the second blower 16 as shown by the arrow AR35, flows from the one end 122*a* of the second ventilation passage 122 to the other end 122*b* of the second ventilation passage 122, and is heated in the second heater core 24 in the second ventilation passage 122. At this time, although air that is in the second ventilation passage 122 passes through the second evaporator 20, the second evaporator 20 is on an off-condition and does not cool the air. Air flowing to the other end 122*b* of the second ventilation passage 122 is blown from the other end 122*b* of the second ventilation passage 122 into the vehicle compartment through the third blowing outlet 136. Thus, in the two-layer mode shown in FIG. 3, the first blowing outlet 134 and the third blowing outlet 136 are an air outlet from which air is blown into the vehicle compartment.

As described above, in the double-cooling cooling mode of the present embodiment, air introduced from the vehicle compartment to the other end 121*b* of the first ventilation passage 121 flows from the other end 121*b* to the one end 121*a* of the first ventilation passage 121 and subsequently flows to the one end 122*a* of the second ventilation passage 122 through the first communication-ventilation passage 130. Air at the one end 122*a* of the second ventilation passage 122 flows from the one end 122*a* to the other end 122*b* of the second ventilation passage 122 and is blown into the vehicle compartment from the other end 122*b* of the second ventilation passage 122. Accordingly, air introduced into the air-conditioning case 12 passes through the first evaporator 18 and the second evaporator 20 in this order, is cooled in the first evaporator 18 and the second evaporator 20, and is blown into the vehicle compartment. Therefore, since air passes through the evaporator 18, 20 twice in total in the air-conditioning case 12, a temperature of the air can be decreased effectively.

In the single-cooling cooling mode, air introduced from outside of the air-conditioning case 12 to the one end 121*a* of the first ventilation passage 121 flows from the one end 121*a* to the other end 121*b* of the first ventilation passage 121 and is blown from the other end 121*b* of the first ventilation passage 121 into the vehicle compartment. Further, air introduced from outside of the air-conditioning case 12 to the one end 122*a* of the second ventilation passage 122 flows from the one end 122*a* to the other end 122*b* of the second ventilation passage 122 and is blown from the other end 122*b* of the second ventilation passage 122 into the vehicle compartment. Accordingly, air, which is a part of air introduced into the air-conditioning case 12 and is introduced into the first ventilation passage 121, passes through the first evaporator 18 without passing through the second evaporator 20 aid is blown into the vehicle compartment. Air, which is a part of air introduced into the air-conditioning case 12 and introduced into the second ventilation passage 122, passes through the second evaporator 20 without passing through the first evaporator 18 and is blown into the vehicle compartment. Therefore, in the single-cooling cooling mode, a pressure loss in an air flow reduces, and a volume of air blowing into the vehicle compartment can be easily increased, as compared to in the double-cooling cooling mode in which air passes through the evaporator 18, 20 twice in total in the air-conditioning case 12.

Furthermore, as shown in FIG. 1, air can be blown from the second blowing door 44 toward the passenger in the vehicle compartment in the double-cooling cooling mode.

According to the present embodiment, in the double-cooling cooling mode, air that is in the vehicle compartment is drawn into the air-conditioning case 12 from the first blowing outlet 134 that is the defroster outlet and, and air of which temperature is adjusted is blown into the vehicle compartment from the second blowing outlet 135 that is the face outlet. Accordingly, the air of which temperature is adjusted flows around an upper body of the passenger in the vehicle compartment. An inside temperature around the upper body of the passenger greatly affects a sensible temperature of the passenger as compared to that around a lower body of the passenger. Therefore, by setting the blowing outlets from which air is blown into the vehicle compartment, the comfort of the passenger can increase without increasing a thermal load in a cooling mode.

According to the present embodiment, the air-conditioning unit 10 has the second communication-ventilation-passage door 38 as the blowing mode switching device that alternatively switches the target, to which the first blower 14 blows air, between the second communication-ventilation passage 132 and the first ventilation passage 121. Accordingly, a blowing direction in which the first blower 14 blows air in the double-cooling cooling mode is unnecessary to be reversed with respect to a blowing direction in which the first blower 14 blows air in the single-cooling cooling mode. Therefore, a blower such as a centrifugal blower that cannot be change a blowing direction can be used as the first blower 14.

In the double-cooling cooling mode of the present embodiment, as shown in, for example, FIG. 1, air that is in the vehicle compartment is introduced into the air-conditioning case 12 through the first blowing outlet 134 that is the air outlet through which air is blown into the vehicle compartment in the two-layer mode shown in FIG. 3. Accordingly, an additional air blowing outlet for performing the double-cooling cooling mode is not necessary.

Further, according to the present embodiment, the ECU 26 sets the single-cooling cooling mode for performing the cooling operation when a temperature in the vehicle compartment is higher than or equal to the predetermined temperature threshold. Conversely, the double-cooling cooling mode is set when the temperature in the vehicle compartment is lower than the predetermined temperature threshold. Thus, the single-cooling cooling mode or the double-cooling cooling mode is performed as required depending on a required volume of air to be blown into the vehicle compartment.

Second Embodiment

A second embodiment of the present disclosure will be described. In the present embodiment, features that are different from the first embodiment will be described mainly. Features corresponding to or equal to that of the preceding embodiment will be omitted or described simply. This is the same in the third embodiment and subsequent embodiments.

Figure 4:
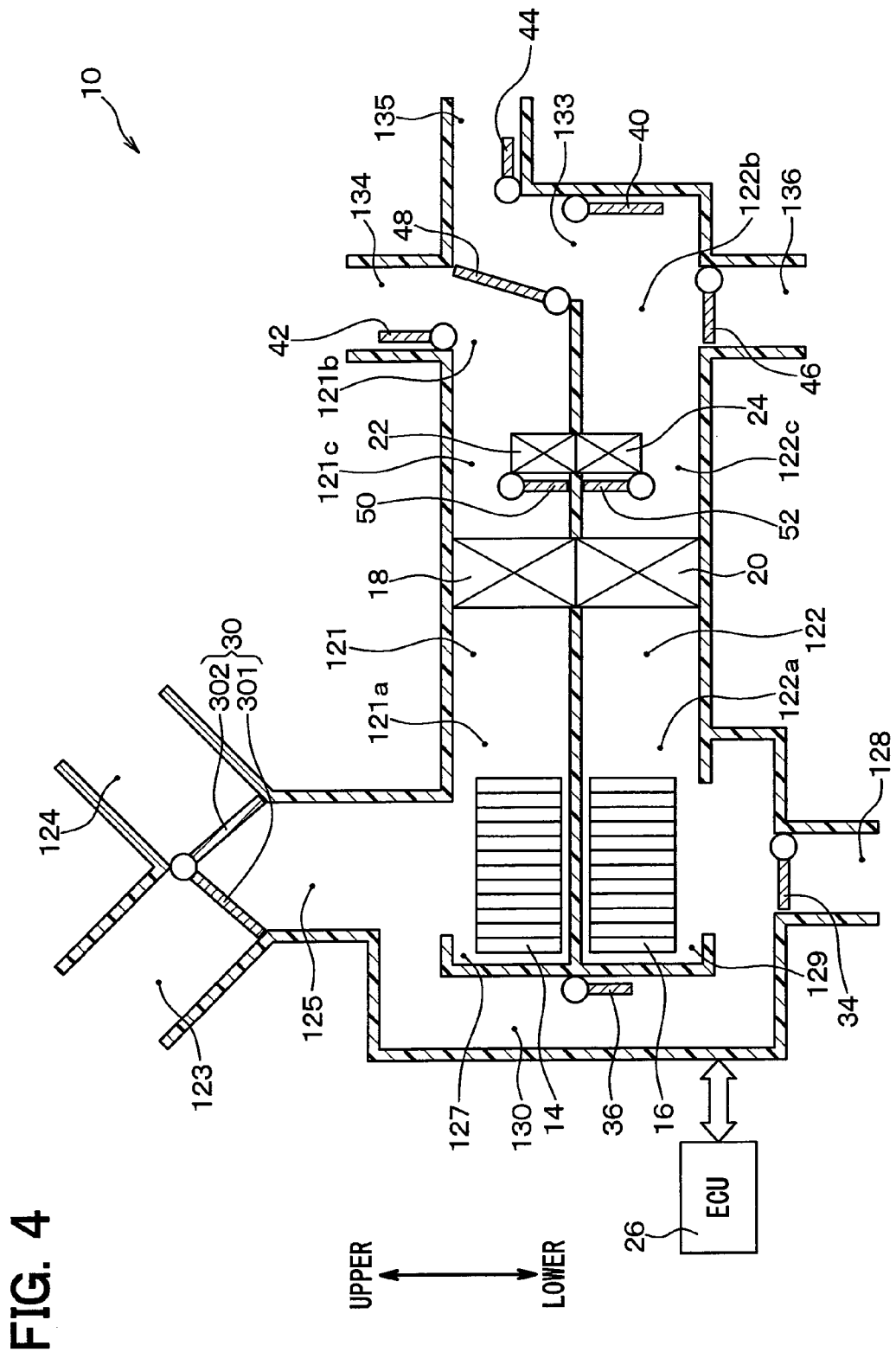
FIG. 4 is a schematic sectional view illustrating a vehicular air-conditioning unit 10 according to a second embodiment.

FIG. 4 is a sectional view schematically illustrating an air-conditioning unit 10 of the present embodiment. As shown in FIG. 4, the air-conditioning unit 10 of the present embodiment is different from the air-conditioning unit 10 of the first embodiment in a point of having no circular ventilation passage 126 (refer FIG. 1), the circular-ventilation-passage door 32, the second communication-ventilation passage 132, nor the second communication-ventilation-passage door 38.

Specifically, according to the air-conditioning unit 10 of the present embodiment, the ECU 26 sets an operation state of the air-conditioning unit 10 in the blowing modes. The blowing modes include the double-cooling cooling mode, the single-cooling cooling mode, and the two-layer mode similar to the first embodiment.

Air flows in the air-conditioning case 12 in the double-cooling cooling mode, the single-cooling cooling mode, and the two-layer mode are the same as the first embodiment. However, as shown in FIG. 4, the air-conditioning unit 10 has no circular ventilation passage 126 (refer FIG. 1). Accordingly, in the double-cooling cooling mode, air flowing to the one end 121a of the first ventilation passage 121 through the first evaporator 18 flows into the first communication-ventilation passage 130 through the first-blower housing portion 127. In this case, since air flows from an air discharge side to an air suction side of the first blower 14 in the first-blower housing portion 127, a blowing by the first blower 14 is stopped. Therefore, the first blower 14 and the second blower 16 are switched to be operated or not to be operated independently from each other, and air is blown by only the second blower 16 in the double-cooling cooling mode.

As described above, the air-conditioning unit 10 of the present embodiment has the single-cooling cooling mode and the double-cooling cooling mode as the blowing modes similar to the first embodiment. Therefore, effects due to the two blowing modes can be produced similar to the first embodiment.

Third Embodiment

A third embodiment of the present disclosure will be described. In the present embodiment, features that are different from the first embodiment will be described mainly.

Figure 5:
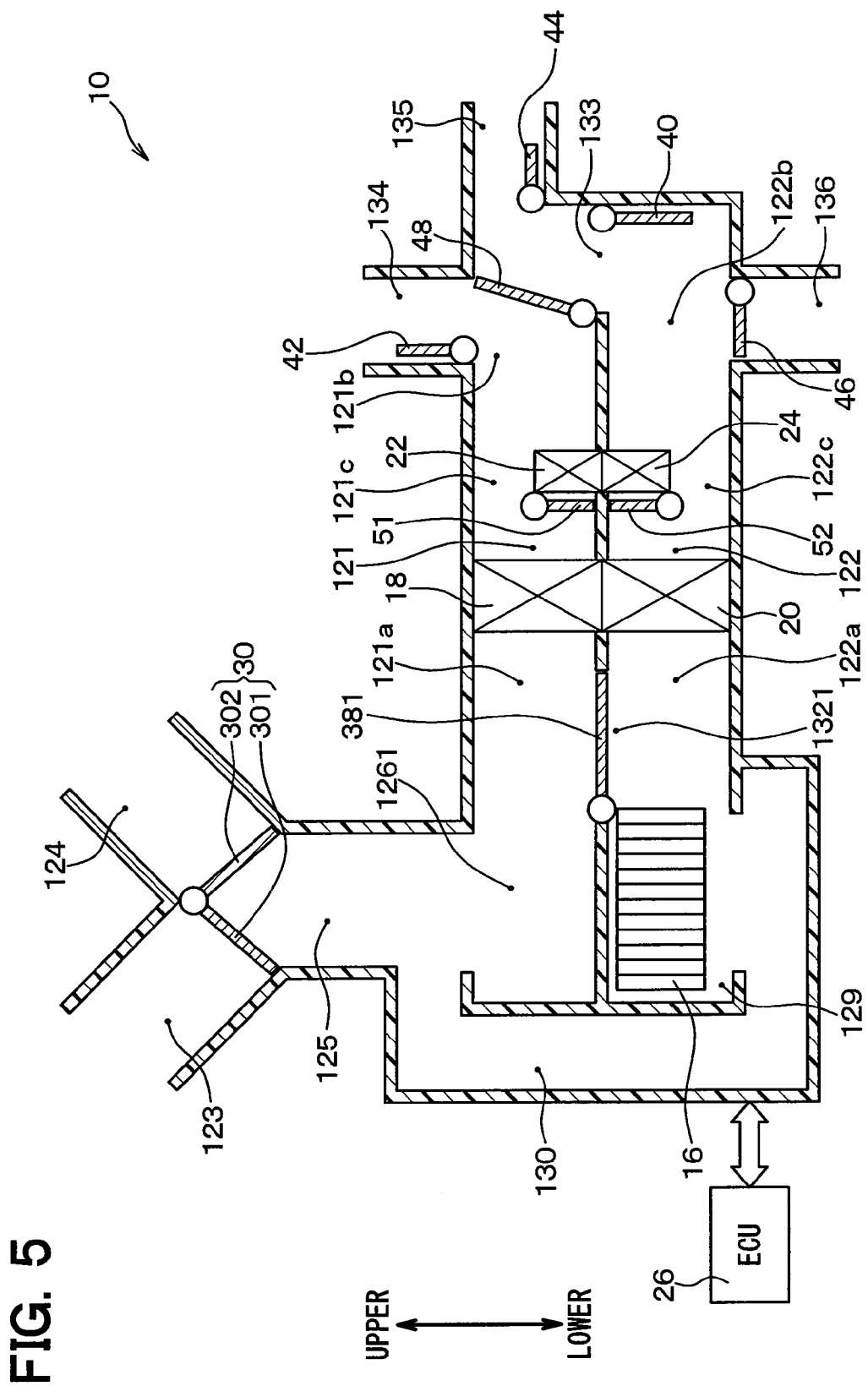
FIG. 5 is a schematic sectional view illustrating a vehicular air-conditioning unit 10 according to a third embodiment and is a diagram showing a location of each door in an air-conditioning case 12 in a double-cooling cooling mode.

FIG. 5 is a sectional view schematically illustrating an air-conditioning unit 10 of the present embodiment. As shown in FIG. 5, the air-conditioning unit 10 of the present embodiment has no circular-ventilation-passage door 32 (refer FIG. 1), the first communication-ventilation-passage door 36, the first blower 14, the first-blower housing portion 127, the second inside-air introducing port 128, nor the second inside-air door 34. The air-conditioning unit 10 of the present embodiment has a circular ventilation passage 1261 shown in FIG. 5 instead of the circular ventilation passage 126 of the first embodiment, a second communication-ventilation passage 1321 shown in FIG. 5 instead of the second communication-ventilation passage 132 of the first embodiment, and a second communication-ventilation-passage door 381 shown in FIG. 5 instead of the second communication-ventilation-passage door 38 of the first embodiment.

As shown in FIG. 5, a blower disposed in the air-conditioning unit 10 is only the second blower 16 in the present embodiment. Therefore, in a description of the present embodiment, the second blower 16 will be referred to as a blower 16. Further, the second-blower housing portion 129 will be referred to as a blower housing portion 129.

The circular ventilation passage 1261 is defined in the same location in the air-conditioning case 12 that is the same as a location of the first-blower housing portion 127 (refer FIG. 1) of the first embodiment. Similar to the circular ventilation passage 126 of the first embodiment, the circular ventilation passage 1261 communicates with the one end 121a of the first ventilation passage 121 and the intake portion 125 such that the one end 121a and the intake portion 125 are connected to each other.

The second communication-ventilation passage 1321 is a ventilation passage that defines the same space in the air-conditioning case 12 as the second communication-ventilation passage 132 of the first embodiment. However, the opening-closing direction of the second communication-ventilation-passage door 381 shown in FIG. 5 is different from that of the second communication-ventilation-passage door 38 of the first embodiment. Accordingly, the second communication-ventilation passage 1321 is a passage through which the one end 121a of the first ventilation passage 121 communicates with the blower housing portion 129 and with the one end 122a of the second ventilation passage 122.

The second communication-ventilation-passage door 381 is provided in the second communication-ventilation passage 1321. The second communication-ventilation-passage door 381 is rotated and functions as a switching portion that sets a target to which the blower 16 blows air. The second communication-ventilation-passage door 381 is located to any one of two communicating positions. At a first communicating position of the two communicating positions, the second communication-ventilation-passage door 381 closes the second communication-ventilation passage 1321 and is located such that the one end 121a of the first ventilation passage 121 communicates with the circular ventilation passage 1261 as shown in FIG. 5. That is, at the first communicating position, the second communication-ventilation-passage door 381 blocks blowing air from the blower 16 to the first ventilation passage 121, allows air flowing to the second ventilation passage 122, and is set to the first switching position where the first ventilation passage 121 is open to the first communication-ventilation passage 130.

Figure 6:
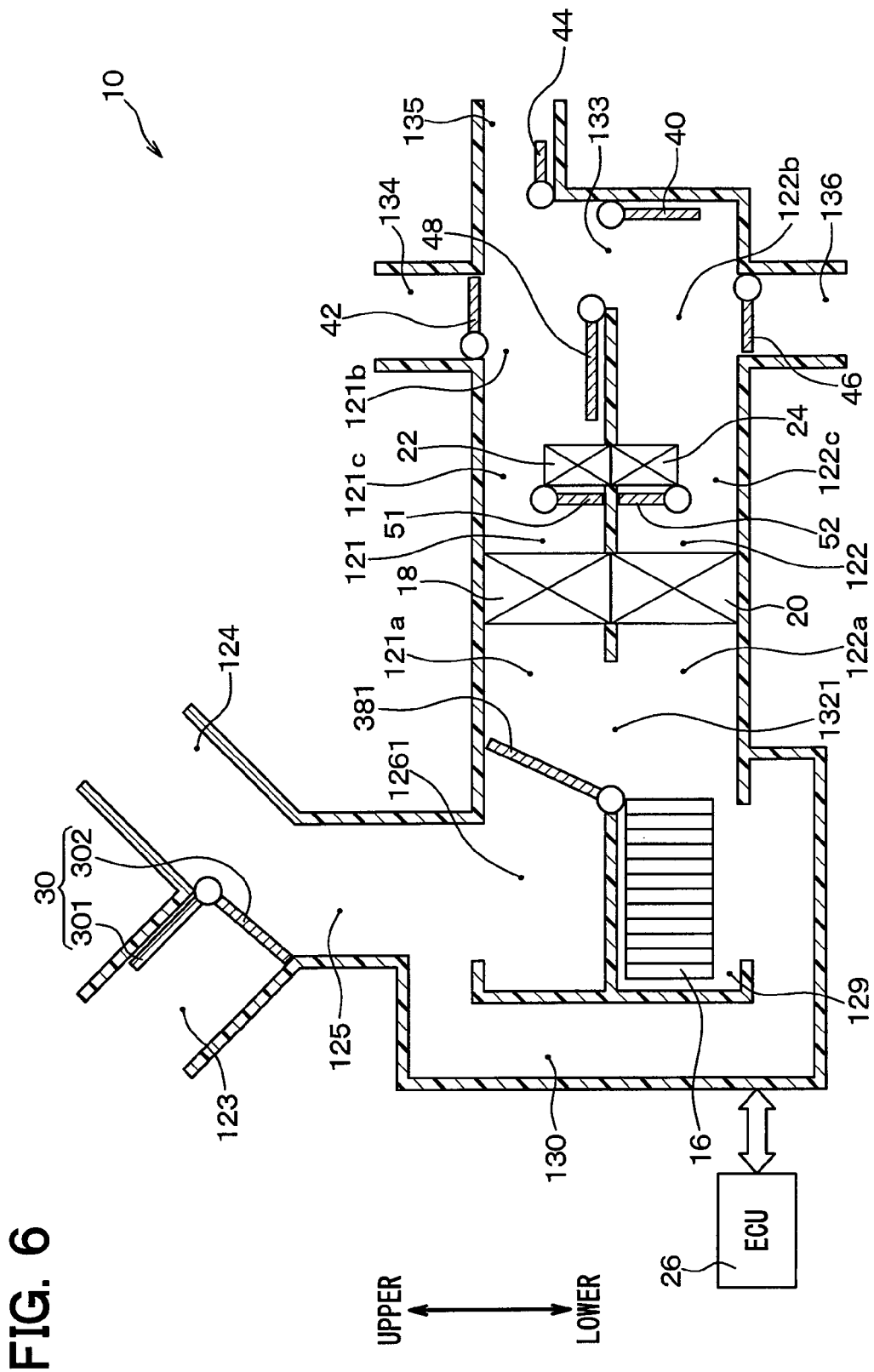
FIG. 6 is a schematic sectional view illustrating the vehicular air-conditioning unit 10 shown in FIG. 5 and is a diagram showing a location of each door in the air-conditioning case 12 in a single-cooling cooling mode.

At a second communicating position of the two communicating positions, the second communication-ventilation-passage door 381 opens the second communication-ventilation passage 1321 and blocks a communication between the one end 121a of the first ventilation passage 121 and the circular ventilation passage 1261 as shown in FIG. 6. That is, at the second communicating position, the second communication-ventilation-passage door 381 allows air flowing to both the first ventilation passage 121 and the second ventilation passage 122 and is set to the second switching position where a communication between the first ventilation passage 121 and the first communication-ventilation passage 130 is blocked.

The ECU 26 sets an operation condition of the air-conditioning unit 10 to any one of the blowing modes. The blowing modes include the double-cooling cooling mode and the single-cooling cooling mode similar to the first embodiment. The two-layer mode that is described in the first embodiment is not included.

The double-cooling cooling mode of the present embodiment will be described. In the double-cooling cooling mode, the ECU 26 operates the doors to be located as shown in FIG. 5. Specifically, the second communication-ventilation-passage door 381 is located to the first communication position such that the second communication-ventilation passage 1321 is closed and that the one end 121a of the first ventilation passage 121 communicates with the circular ventilation passage 1261 as shown in FIG. 5. Positions of the other doors are the same as in the double-cooling cooling mode of the first embodiment.

The ECU 26 operates the blower 16 and performs the cooling operation in a manner that the first evaporator 18 and the second evaporator 20 cool air. In the double-cooling cooling mode, air flows as the same as shown in FIG. 1.

Specifically, in FIG. 5, air that is in the vehicle compartment is introduced from the first blowing outlet 134 to the other end 121b of the first ventilation passage 121. The introduced air flows from the other end 121b of the first ventilation passage 121 to the one end 121a of the first ventilation passage 121 and is cooled in the first evaporator 18 along the way. The air is drawn from the one end 121a of the first ventilation passage 121 to the blower 16 through the circular ventilation passage 1261 and the first communication-ventilation passage 130.

Air drawn into the blower 16 is blown from the blower 16 to the one end 122a of the second ventilation passage 122. Air flowing to the one end 122a of the second ventilation passage 122 flows from the one end 122a of the second ventilation passage 122 to the other end 122b of the second ventilation passage 122 and is cooled in the second evaporator 20 along the way. Air flowing to the other end 122b of the second ventilation passage 122 is blown from the other end 122b into the vehicle compartment through the third communication-ventilation passage 133 and the second blowing outlet 135.

The single-cooling cooling mode will be described. In the single-cooling cooling mode, the ECU 26 operates the doors to be located at positions shown in FIG. 6. FIG. 6 is a sectional view schematically illustrating the same air-conditioning unit 10 as FIG. 5 and shows a position of each door in the air-conditioning case 12 in the single-cooling cooling mode. Specifically, in the single-cooling cooling mode, the second communication-ventilation-passage door 381 is rotated to the second communication position to block a communication between the one end 121a of the first ventilation passage 121 and the circular ventilation passage 1261 and to open the second communication-ventilation passage 1321. Positions of the other doors are the same as that in the single-cooling cooling mode of the first embodiment.

The ECU 26 operates the blower 16 and performs the cooling operation in a manner that air is cooled by operating the first evaporator 18 and the second evaporator 20. In the single-cooling cooling mode, airflows are the same as that shown in FIG. 2.

Specifically, as shown in FIG. 6, air outside of the air-conditioning case 12, in other words, air outside of the vehicle compartment, is introduced to the intake portion 125 from the first inside-air introducing port 124. The air introduced into the intake portion 125 is drawn into the blower 16 through the first communication-ventilation passage 130.

Air drawn into the blower 16 is blown from the blower 16 to the one end 121a of the first ventilation passage 121 through the second communication-ventilation passage 1321 and blows from the blower 16 to the one end 122a of the second ventilation passage 122. An airflow from the one end 121a of the first ventilation passage 121 and an airflow from the one end 122a of the second ventilation passage 122 are the same as that shown in FIG. 2.

The single-cooling cooling mode is described as above. Although the cooling operation of the air-conditioning unit 10 is performed by the single-cooling cooling mode or the double-cooling cooling mode, a heating operation is also performed with the air-conditioning unit 10. For example, in the heating operation shown in FIG. 6, the first evaporator 18 and the second evaporator 20 are on an off-condition, the first air-mix door 50 and the second air-mix door 52 are rotated to the max-hot position, and air is heated in the first heater core 22 and the second heater core 24 by flowing through the first heater core 22 and the second heater core 24.

As described above, the blowing modes of the air-conditioning unit 10 of the present embodiment includes the single-cooling cooling mode and the double-cooling cooling mode similar to the first embodiment, and effects by the two blowing modes can be produced similar to the first embodiment.

The second communication-ventilation-passage door 381 of the present embodiment opens or closes the circular ventilation passage 1261 and the second communication-ventilation passage 1321 and functions as both the circular-ventilation-passage door 32 and the second communication-ventilation-passage door 38 of the first embodiment. Therefore, a configuration of the air-conditioning unit 10 can be simplified.

Fourth Embodiment

A fourth embodiment of the present disclosure will be described In the present embodiment, features that are different from the first embodiment will be described mainly.

Figure 7:
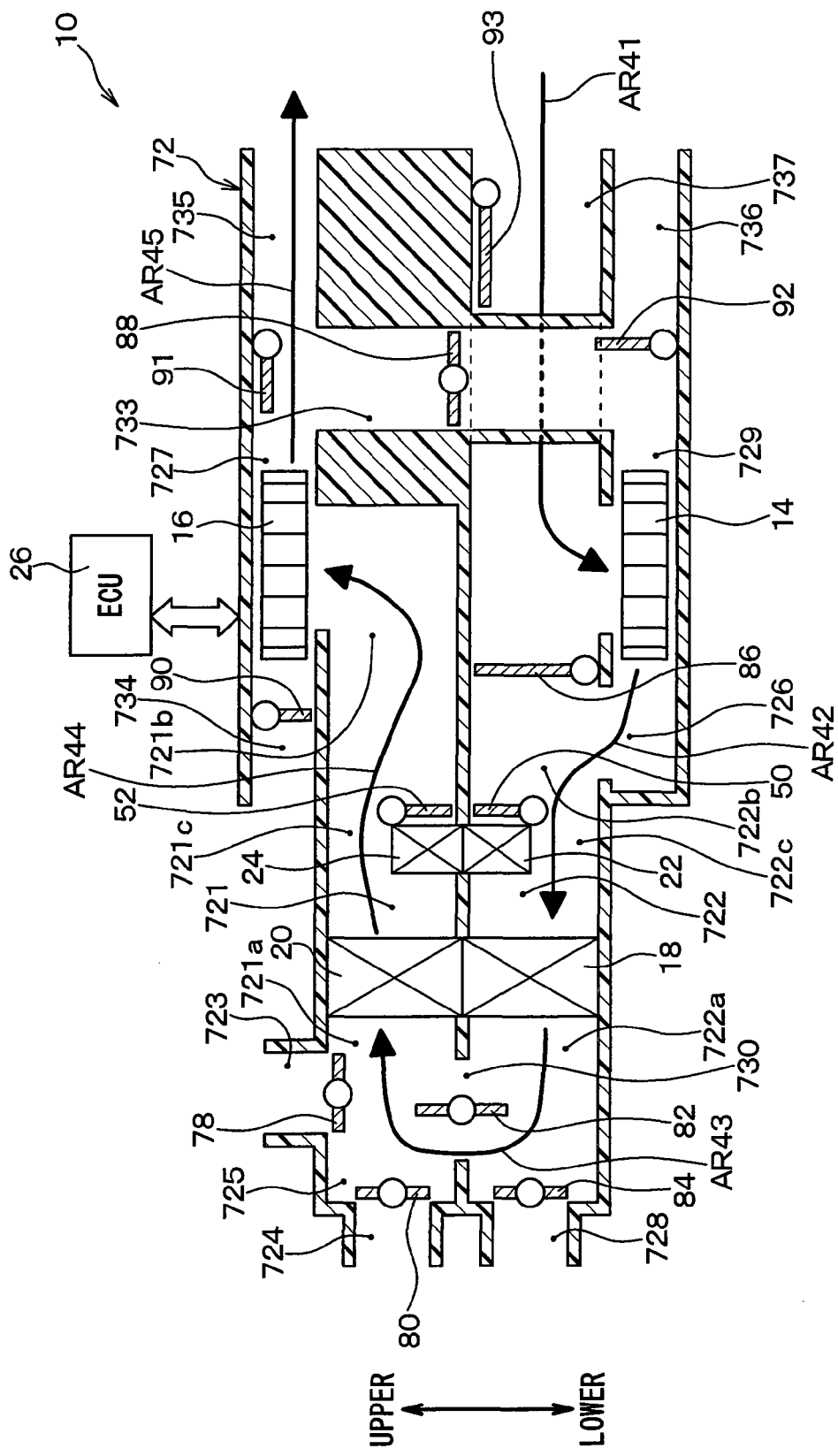
FIG. 7 is a schematic sectional view illustrating a vehicular air-conditioning unit 10 according to a fourth embodiment and is a diagram showing an air flow in an air-conditioning case 72 in a double-cooling cooling mode.

FIG. 7 is a sectional view schematically illustrating an air-conditioning unit 10 of the present embodiment. In the air-conditioning unit 10 of the present disclosure, an arrangement of the blowers 14, 16 in a flow direction of air in an air-conditioning case 72 is different from that of the first embodiment.

The air-conditioning case 72 shown in FIG. 7 corresponds to the air-conditioning case 12 of the first embodiment and constitutes a housing of the air-conditioning unit 10. As shown in FIG. 7, the air-conditioning case 72 has an upper ventilation passage 721, a lower ventilation passage 722, an outside-air introducing port 723, a first inside-air introducing port 724, an intake portion 725, a circular ventilation passage 726, an upper blower-housing portion 727, a second inside-air introducing port 728, a lower blower-housing portion 729, a first communication-ventilation passage 730, a third communication-ventilation passage 733, a first blowing outlet 734, a second blowing outlet 735, a third blowing outlet 736, and a third inside-air introducing port 737.

The upper ventilation passage 721 and the lower ventilation passage 722 extend such that air flows therein in the horizontal direction, and are formed in parallel with each other. The upper ventilation passage 721 is located above the lower ventilation passage 722. The second evaporator 20 and the second heater core 24 are disposed in the upper ventilation passage 721, and the first evaporator 18 and the first heater core 22 are disposed in the lower ventilation passage 722. The upper ventilation passage 721 corresponds to the second ventilation passage of the present disclosure, and the lower ventilation passage 722 corresponds to the first ventilation passage of the present disclosure.

The upper ventilation passage 721 has an upper bypass passage 721c, and the upper bypass passage 721c is defined in parallel with the second heater core 24 similar to the second bypass passage 122c of the first embodiment. The second air-mix door 52 that is the same as the first embodiment is disposed in the upper ventilation passage 721 on a side adjacent to an other end 721b of the upper ventilation passage 721 with respect to the second heater core 24.

The lower ventilation passage 722 has a lower bypass passage 722c, and the lower bypass passage 722c is defined in parallel with the first heater core 22 similar to the first bypass passage 121c of the first embodiment. The first air-mix door 50 that is the same as the first embodiment is disposed in the lower ventilation passage 722 on a side adjacent to an other end 722b of the lower ventilation passage 722 with respect to the first heater core 22.

The outside-air introducing port 723 communicates with a space outside of the vehicle compartment similar to the outside-air introducing port 123 of the first embodiment. The first inside-air introducing port 724 communicates with an inside of the vehicle compartment similar to the first inside-air introducing port 124 of the first embodiment. Both the outside-air introducing port 723 and the first inside-air introducing port 724 connect to the intake portion 725 in the air-conditioning case 72. The intake portion 725 connects to a one end 721a of the upper ventilation passage 721.

An outside-air door 78 is disposed in the outside-air introducing port 723, and the outside-air door 78 rotates to open or close the outside-air introducing port 723. A first inside-air door 80 is disposed in the first inside-air introducing port 724, and the first inside-air door 80 rotates to open or close the first inside-air introducing port 724.

The upper blower-housing portion 727 houses the second blower 16, and the lower blower-housing portion 729 houses the first blower 14.

The first communication-ventilation passage 730 is a passage through which a one end 722a of the lower ventilation passage 722 connects to the one end 721a of the upper ventilation passage 721 and to the intake portion 725. A first communication-ventilation-passage door 82 is disposed in the first communication-ventilation passage 730, and the first communication-ventilation-passage door 82 rotates to open or close the first communication-ventilation passage 730.

The other end 721b of the upper ventilation passage 721 connects to an air suction side of the second blower 16 in the upper blower-housing portion 727.

The second inside-air introducing port 728 communicates with an inside of the vehicle compartment similar to the second inside-air introducing port 128 of the first embodiment. The second inside-air introducing port 728 connects to the one end 722a of the lower ventilation passage 722 in the air-conditioning case 72. A second inside-air door 84 is disposed in the second inside-air introducing port 728, and the second inside-air door 84 rotates to open or close the second inside-air introducing port 728. The second inside-air intruding port 728, the outside-air introducing port 723, the first inside-air introducing port 724, and the intake portion 725, as a whole, constitute an air introducing portion that introduces air from outside of the air-conditioning case 72 to both the one end 721a of the upper ventilation passage 721 and the one end 722a of the lower ventilation passage 722.

Figure 8:
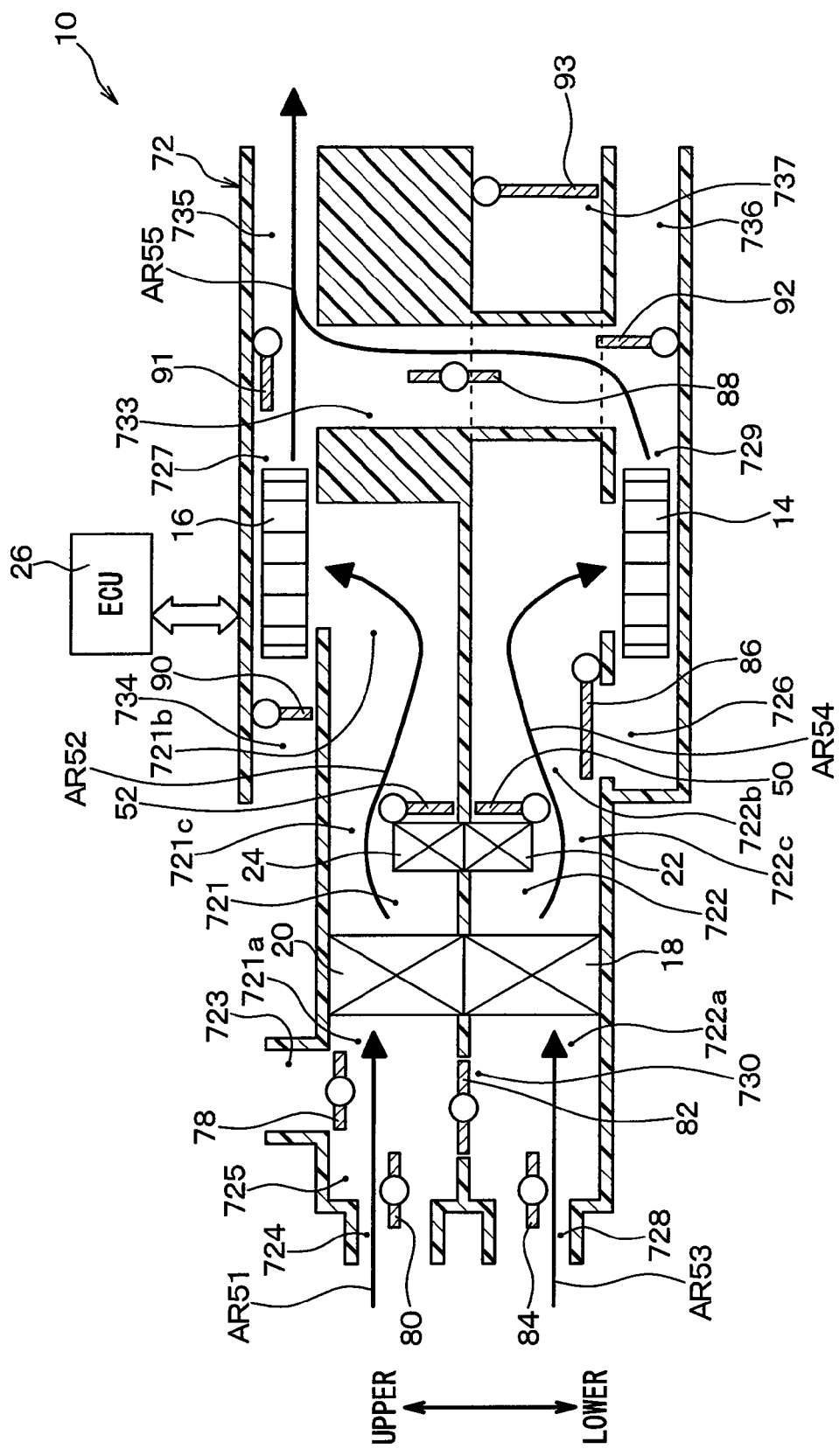
FIG. 8 is a schematic sectional view illustrating the vehicular air-conditioning unit 10 shown in FIG. 7 and is a diagram showing an air flow in the air-conditioning case 72 in a single-cooling cooling mode.

The circular ventilation passage 726 is a passage through which the other end 722b of the lower ventilation passage 722 connects to an air blowing side of the first blower 14 in the lower blower-housing portion 729. A circular-ventilation-passage door 86 is disposed between the circular ventilation passage 726 and the other end 722b of the lower ventilation passage 722, and the circular-ventilation-passage door 86 is positioned at one of two circulation positions. At a first circulation position, as shown in FIG. 7, the circular-ventilation-passage door 85 opens the circular-ventilation passage 726 and blocks a communication between the other end 722b of the lower ventilation passage 722 and the air suction side of the first blower 14 in the lower blower-housing portion 729. At a second circulation position, as shown in FIG. 8 described after, the circular-ventilation-passage door 85 closes the circular ventilation passage 726 and allows a communication between the other end 722b of the lower ventilation passage 722 and the air suction side of the first blower 14 in the lower blower-housing portion 729.

The third communication-ventilation passage 733 is a passage through which an air blowing side of the second blower 16 in the upper blower-housing portion 727 connects to the air blowing side of the first blower 14 in the lower blower-housing portion 729. A third communication-ventilation-passage door 88 is disposed in the third communication-ventilation passage 733, and the third communication-ventilation-passage door 88 rotates to open or close the third communication-ventilation passage 733.

The first blowing outlet 734 is the defroster outlet similar to the first blowing outlet 134 of the first embodiment. In the air-conditioning case 72, the first blowing outlet 734 connects to the air blowing side of the second blower 16 in the upper blower-housing portion 727. A first blowing door 90 is disposed in the first blowing outlet 734, and the first blowing door 90 rotates to open or close the first blowing outlet 734.

The second blowing outlet 735 is the face outlet similar to the second blowing outlet 135 of the first embodiment. In the air-conditioning case 72, the second blowing outlet 735 connects to the air blowing side of the second blower 16 in the upper blower-housing portion 727 and connects to the air blowing side of the first blower 14 in the lower blower-housing portion 729 through the third communication-ventilation passage 733. A second blowing door 91 is disposed in the second blowing outlet 735, and the second blowing door 91 rotates to open or close the second blowing outlet 735.

The third blowing outlet 736 is the foot outlet similar to the third blowing outlet 136 of the first embodiment. In the air-conditioning case 72, the third blowing outlet 736 connects to the air blowing side of the second blower 16 in the upper blower-housing portion 727 through the third communication-ventilation passage 733 and connects to the air blowing side of the first blower 14 in the lower blower-housing portion 729. A third blowing door 92 is disposed in the third blowing outlet 736, and the third blowing door 92 rotates to open or close the third blowing outlet 736.

The third inside-air introducing port 737 communicates with an inside of the vehicle compartment through a duct that is not shown. In the air-conditioning case 72, the third inside-air introducing port 737 connects to the air suction side of the first blower 14 in the lower blower-housing portion 729. A third inside-air door 93 is disposed in the third inside-air introducing port 737, and the third inside-air door 93 rotates to open or close the third inside-air introducing port 737.

Since the air-conditioning case 72 is constituted as described above, the first blower 14 draws air through the third inside-air introducing port 737 and blows the air to the other end 722b of the lower ventilation passage 722, or draws air through the other end 722b of the lower ventilation passage 722 and blows the air into the vehicle compartment through the second blowing outlet 735 or the third blowing outlet 736, depending on a location of the circular-ventilation-passage door 86 and a location of the third inside-air door 93. Further, the second blower 16 draws air from the other end 721b of the upper ventilation passage 721 and blows the air into the vehicle compartment through the first blowing outlet 734, the second blowing outlet 735, or the third blowing outlet 736.

The ECU 26 sets an operation condition of the air-conditioning unit 10 to any one of the blowing modes. The blowing modes include the double-cooling cooling mode, the single-cooling cooling mode, and the two-layer mode similar to the first embodiment.

The double-cooling cooling mode of the present embodiment will be described hereafter. In the double-cooling cooling mode, the ECU 26 operates the doors to be positioned as shown in FIG. 7. The outside-air door 78 closes the outside-air introducing port 723. The first inside-air door 80 closes the first inside-air introducing port 724. The first communication-ventilation-passage door 82 opens the first communication-ventilation passage 730. The second inside-air door 84 closes the second inside-air introducing port 728. The circular-ventilation-passage door 86 opens the circular ventilation passage 726 and blocks a communication between the other end 722b of the lower ventilation passage 722 and the air suction side of the first blower 14 in the lower blower-housing portion 729. The third communication-ventilation-passage door 88 closes the third communication-ventilation passage 733. The first blowing door 90 closes the first blowing outlet 734. The second blowing door 91 opens the second blowing outlet 735. The third blowing door 92 closes the third blowing outlet 736. The third inside-air door 93 opens the third inside-air introducing port 737.

The ECU 26 operates the first blower 14 and the second blower 16 and performs the cooling operation by operating the first evaporator 18 and the second evaporator 20 to cool air. In the double-cooling cooling mode, air flows in the air-conditioning case 72 as shown in FIG. 7 by arrows AR41, AR42, AR43, AR44, and AR45.

Specifically, as shown in FIG. 7, air inside of the vehicle compartment is drawn into the first blower 14 from the third inside-air introducing port 737, and the air is introduced to the other end 722b of the lower ventilation passage 722 through the circular ventilation passage 726. The introduced air flows from the other end 722b of the lower ventilation passage 722 to the one end 722a of the lower ventilation passage 722, and is cooled in the first evaporator 18 along the way. Subsequently, the air flows from the one end 722a of the lower ventilation passage 722 to the one end 721a of the upper ventilation passage 721 through the first communication-ventilation passage 730.

Air flowing to the one end 721a of the upper ventilation passage 721 flows from the one end 721a of the upper ventilation passage 721 to the other end 721b of the upper ventilation passage 721 and is cooled in the second evaporator 20 along the way. Air flowing to the other end 722b of the lower ventilation passage 722 is drawn into the second blower 16 from the other end 722b and is blown into the vehicle compartment from the second blower 16. Thus, in the double-cooling cooling mode of the present embodiment, air introduced into the air-conditioning case 72 is cooled twice similar to the first embodiment and is blown into the vehicle compartment.

The single-cooling cooling mode of the present embodiment will be described hereafter. In the single-cooling cooling mode, the ECU 26 rotates the doors to be located at positions shown in FIG. 8. FIG. 8 is a sectional view schematically illustrating the same air-conditioning unit 10 as FIG. 7 and shows airflows in the air-conditioning case 72 in the single-cooling cooling mode.

Specifically, the first inside-air door 80 opens the first inside-air introducing port 724 as shown in FIG. 8. The first communication-ventilation-passage door 82 closes the first communication-ventilation passage 730. The second inside-air door 84 opens the second inside-air introducing port 728. The circular-ventilation-passage door 86 closes the circular ventilation passage 726 and allows a communication between the other end 722b of the lower ventilation passage 722 and the air suction side of the first blower 14 in the lower blower-housing portion 729. The third communication-ventilation-passage door 88 opens the third communication-ventilation passage 733. The third inside-air door 93 closes the third inside-air introducing port 737. Positions of the other doors are the same as that shown in FIG. 7.

The ECU 26 operates the first blower 14 and the second blower 16 and performs the cooling operation by operating the first evaporator 18 and the second evaporator 20 to cool air. Air is introduced into the upper ventilation passage 721 from the first inside-air introducing port 724, and air is introduced into the lower ventilation passage 722 from the second inside-air introducing port 728 in the single-cooling cooling mode. Accordingly, in the air-conditioning case 72, air flows as shown in FIG. 8 by arrows AR51, AR52, AR53, AR54, and AR55.

Specifically, as shown by the arrow AR51 in FIG. 8, air inside of the vehicle compartment is introduced to the one end 721a of the upper ventilation passage 721 from the first inside-air introducing port 724 through the intake portion 725. At the same time, air inside of the vehicle compartment is introduced to the one end 722a of the lower ventilation passage 722 as shown by the arrow AR53.

Air flowing to the one end 721a of the upper ventilation passage 721 flows from the one end 721a of the upper ventilation passage 721 to the other end 721b of the upper ventilation passage 721 and is cooled in the second evaporator 20 along the way. The cooled air is drawn into the second blower 16 from the other end 721b of the upper ventilation passage 721 and is blown into the vehicle compartment from the second blower 16 through the second blowing outlet 735.

While air is flowing in the upper ventilation passage 721, air flowing to the one end 722a of the lower ventilation passage 722 flows from the one end 722a of the lower ventilation passage 722 to the other end 722b of the lower ventilation passage 722 and is cooled in the first evaporator 18 along the way. The cooled air is drawn into the first blower 14 from the other end 722b of the lower ventilation passage 722. Air blown from the first blower 14 is blown into the vehicle compartment together with air from the second blower 16 through the third communication-ventilation passage 733 and the second blowing outlet 735. Thus, in the single-cooling cooling mode of the present embodiment, air introduced into the upper ventilation passage 721 is blown into the vehicle compartment after being cooled once in the second evaporator 20, and air introduced into the lower ventilation passage 722 is blown into the vehicle compartment after being cooled once in the first evaporator 18. That is, in the single-cooling cooling mode, although each blower 14, 16 of the first embodiment blows air to push the air into each evaporator 18, 20, each blower 14, 16 of the present embodiment blows air to draw the air from each evaporator 18, 20.

The two-layer mode will be described hereafter. The two-layer mode is set when the heating mode is performed. In the two-layer mode, for example, the ECU 26 rotates the outside-air door 78 to a position where the outside-air introducing port 723 is open and rotates the first inside-air door 80 to a position where the first inside-air introducing port 724 is closed, from a position of each door shown in FIG. 8. Further, the ECU 26 rotates the first blowing door 90 to a position where the first blowing outlet 734 is open, rotates the second blowing door 91 to a position where the second blowing outlet 735 is closed, rotates the third blowing door 92 to a position where the third blowing outlet 736 is open, and rotates the third communication-ventilation-passage door 88 to a position where the third communication-tion-ventilation passage 733 is closed.

Moreover, the ECU 26 rotates the second air-mix door 52 such that air passes through the second heater core 24 and the air is heated in the second heater core 24, and rotates the first air-mix door 50 such that air passes through the first heater core 22 and the air is heated in the first heater core 22. Similar to the first embodiment, the first evaporator 18 and the second evaporator 20 are put in the off-condition.

As described above, the blowing modes of the air-conditioning unit 10 of the present embodiment includes the single-cooling cooling mode and the double-cooling cooling mode similar to the first embodiment, and effects by the two blowing modes can be produced similar to the first embodiment.

Fifth Embodiment

A fifth embodiment of the present disclosure will be described. In the present embodiment, features that are different from the fourth embodiment will be described mainly.

Figure 9:
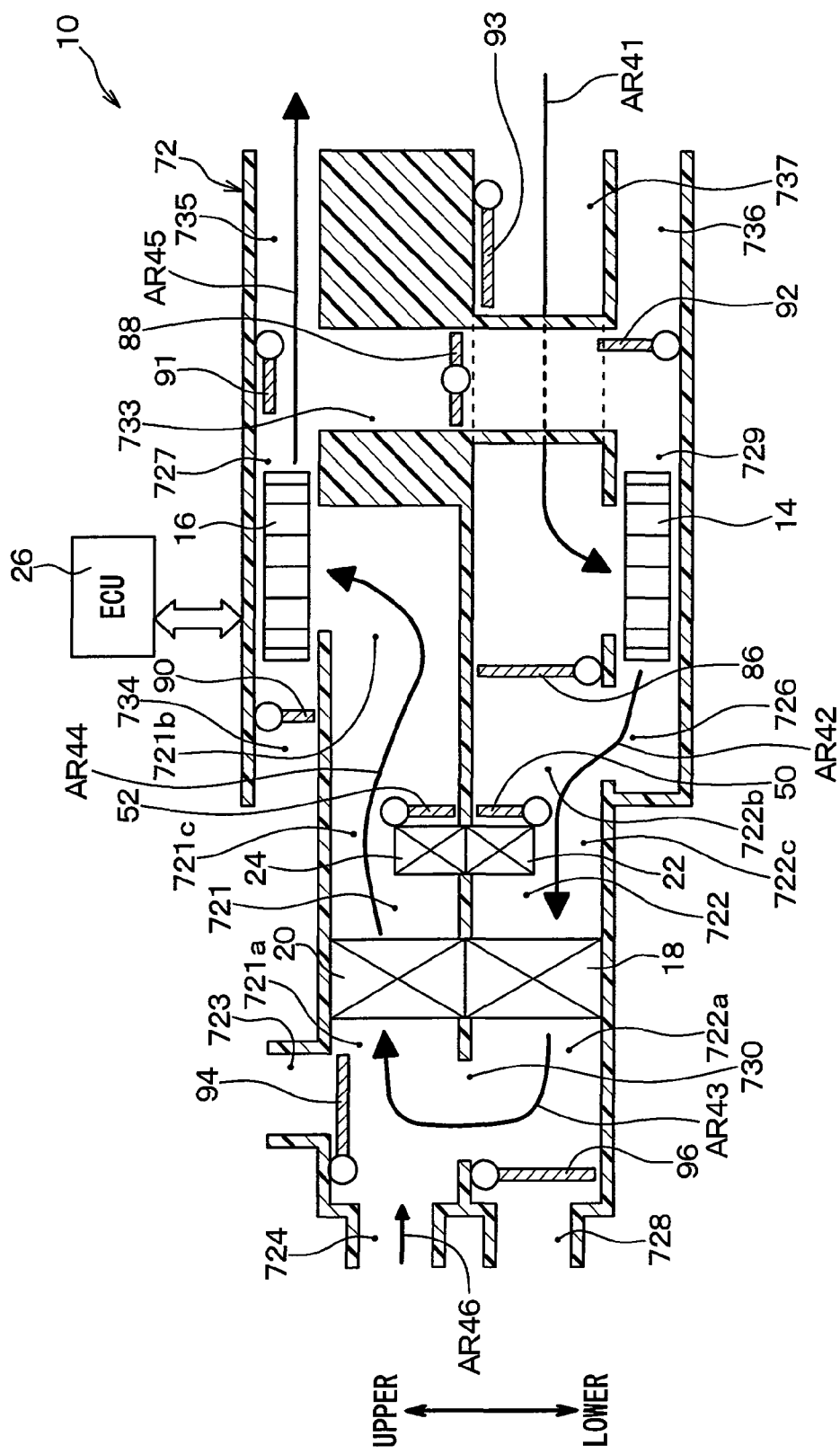
FIG. 9 is a schematic sectional view illustrating a vehicular air-conditioning unit 10 according to a fifth embodiment and is a diagram showing a location of each door and an air flow in an air-conditioning case 72 in a double-cooling cooling mode.

FIG. 9 is a sectional view schematically illustrating an air-conditioning unit 10 of the present embodiment and shows a position or each door and airflows in the air-conditioning case 72 in the double-cooling cooling mode. As shown in FIG. 9, the air-conditioning unit 10 of the present embodiment has an inside-outside air door 94 instead of the outside-air door 78 and the first inside-air door 80 of the fourth embodiment. The inside-outside air door 94 is rotated to open one of the outside-air introducing port 723 and the first inside-air introducing port 724 and to close the other one. Specifically, the inside-outside air door 94 is positioned to one of two inside-outside air positions. At a first inside-outside air position, the inside-outside air door 94 closes the outside-air introducing port 723 and open the first inside-air introducing port 724 as shown in FIG. 9. Conversely, at a second inside-outside air position, the inside-outside air door 94 opens the outside-air introducing port 723 and closes the first inside-air introducing port 724. The inside-outside air door 94 corresponds to an introducing-port switching portion and switches airflows at the outside-air introducing port 723 and the first inside-air introducing port 724 by being rotated to the first inside-outside air position or the second inside-outside air position.

In the double-cooling cooling mode, the inside-outside air door 94 is rotated to the first inside-outside air position. In the single-cooling cooling mode, the inside-outside air door 94 is rotated to the first or the second inside-outside air position.

Further, the air-conditioning unit 10 of the present embodiment has a first communication-ventilation-passage door 96 shown in FIG. 9 instead of the first communication-ventilation-passage door 82 and the second inside-air door 84 of the fourth embodiment. The first communication-ventilation-passage door 96 is rotated to be positioned to one of two communication positions. At a first communication position, the first communication-ventilation-passage door 96 closes the second inside-air introducing port 728 and opens the first communication-ventilation passage 730 as shown in FIG. 9. At a second communication position, the first communication-ventilation-passage door 96 opens the second inside-air introducing port 728 and closes the first communication-ventilation passage 730.

In the double-cooling cooling mode, the first communication-ventilation-passage door 96 is rotated to the first communication position. In the single-cooling cooling mode, the first communication-ventilation-passage door 96 is rotated to the second communication position.

In the double-cooling cooling mode of the present embodiment, air flows in the air-conditioning case 72 as shown by the arrows AR41, AR42, AR43, AR44, and AR45 in FIG. 9 similar to the fourth embodiment. However, the first inside-air introducing port 724 is open in contrast to the fourth embodiment. Then, the first blower 14 and the second blower 16 are operated such that an air volume from the second blower 16 increases a predetermined air-volume difference larger than an air volume from the first blower 14. The purpose is to prevent air, which flows to the one end 721a of the upper ventilation passage 721, from flowing out of the air-conditioning case 72 from the first inside-air introducing port 724.

The predetermined air-volume difference is experimentally set, for example, such that air from the first communication-ventilation passage 730 is prevented from flowing out of the air-conditioning case 72 from the first inside-air introducing port 724 and that an air volume flowing into the air-conditioning case 72 from the first inside-air introducing port 724 (refer the arrow AR46 in FIG. 9) becomes small. To increase an air volume from the second blower 16 to have the air-volume difference, for example, a fan diameter of the second blower 16 may increase, a fan height that is a length of a fan of the second blower 16 in an axial direction may increase, a rotation speed of the second blower 16 may increase, and the upper ventilation passage 721 may be constituted to decrease a pressure loss in the upper ventilation passage 721 in a flow direction of air.

In the present embodiment, the two-layer mode is set similar to the fourth embodiment in addition to the double-cooling cooling mode and the single-cooling cooling mode.

As described above, in the air-conditioning unit 10 of the present embodiment, an air flow in the air-conditioning case 72 in both the single-cooling cooling mode and the double-cooling cooling mode is the same as that in the fourth embodiment. Therefore, effects by the two blowing modes can be provided similar to the fourth embodiment.

According to the present embodiment, a quantity of the doors that are disposed in the air-conditioning case 72 can decrease as compared to the fourth embodiment with performing the single-cooling cooling mode, the double-cooling cooling mode, and the two-layer mode similar to the fourth embodiment. Accordingly, a configuration of the air-conditioning unit 10 can be simplified.

According to the present embodiment, the first blower 14 and the second blower 16 are operated such that an air volume from the second blower 16 becomes larger than an air volume from the first blower 14. Therefore, air flowing from the first communication-ventilation passage 730 to the one end 721a of the upper ventilation passage 721 can be prevented from flowing out of the air-conditioning case 72 from the first inside-air introducing port 724 without closing the first inside-air introducing port 724.

(Other Modification)

(1) In the above-described embodiment, although the first blower 14 and the second blower 16 are a centrifugal-type blower, an axial-flow-type blower or the like may be used. For example, since air can be blown in both directions by switching rotation directions when the first blower 14 of the second embodiment is an axial-flow-type blower, the first blower 14 may be operated to blow air into the first communication-ventilation passage 130 from the one end 121a of the first ventilation passage 121 in the double-cooling cooling mode. In this case, a larger blowing capacity can be provided as compared to a case where the first blower 14 is stopped.

(2) Although the first blower 14 and the second blower 16 are constituted as a separate blower, the first blower 14 and the second blower 16 may be blowers, for example, that are rotated integrally by a single electric motor.

(3) In the double-cooling cooling mode and the single-cooling cooling mode of the above-described embodiments, the first air-mix door 50 and the second air-mix door 52 are rotated between the max-cool position and the max-hot position to regulate a blowing temperature of air blown into the vehicle compartment. However, the first air-mix door 50 and the second air-mix door 52 may be fixed to the max-cool position, and a cooling capacity of the first evaporator 18 and the second evaporator 20 is adjusted to regulate the blowing temperature of air blown into the vehicle compartment.

(4) In the double-cooling cooling mode of the first embodiment, the first blowing outlet 134 is the air introducing port from which air is introduced into the air-conditioning case 12, and the second blowing outlet 135 is the air blowing outlet from which conditioned air that is in the air-conditioning case 12 is blown into the vehicle compartment. However, the air introducing port and the air blowing outlet in the double-cooling cooling mode are not limited to such examples. For example, the first blowing outlet 134 and the second blowing outlet 135 may be the air introducing port, and the third blowing outlet 136 may be the air blowing outlet, by switching the third communication-ventilation-passage door 40 and the middle-mode door 48 from door positions shown in FIG. 1 and by positioning the third blowing door 46 to open the third blowing outlet 136. As described above, the air introducing port and the air blowing outlet in the double-cooling cooling mode are not limited as in the second through the fifth embodiment.

(5) In the first embodiment, the air blowing outlet opening to an inside of the vehicle compartment is the second blowing outlet 135 as described with the airflow in the single-cooling cooling mode of FIG. 2, the air blowing outlet may be any one of the first through third blowing outlets 134, 135, 136. This is also the same in the second through fifth embodiments.

(6) According to the airflow shown in FIG. 2 in the single-cooling cooling mode of the first embodiment, air after passing through the first ventilation passage 121 and air after passing through the second ventilation passage 122 are mixed and the mixed air flows to the second blowing outlet 135. However, those air are not necessary to be mixed. For example, the third communication-ventilation-passage door 40 may close the third communication-ventilation passage 133, and the third blowing outlet 136 may open the third blowing door 46 such that air after passing through the second ventilation passage 122 is blown into the vehicle compartment from the third blowing outlet 136.

(7) In the above-described embodiments, in a case of performing the cooling operation, the ECU 26 sets the single-cooling cooling mode when a temperature in the vehicle compartment is higher than or equal to the predetermined temperature threshold. However, the blowing modes may be switched depending on a temperature in the vehicle compartment or a physical value except for the temperature in the vehicle compartment. For example, the ECU 26 may set the single-cooling cooling mode when an air volume blown into the vehicle compartment is increased to be larger than that in the double-cooing cooling mode. In this case, specifically, the ECU 26 determines a target air volume blown into the vehicle compartment and sets the single-cooling cooling mode when the target air volume is higher than or equal to a predetermined air-volume threshold. On the other hand, the ECU 26 sets the double-cooling cooling mode when the target air volume is lower than the predetermined air-volume threshold.

Even in this case, the single-cooling cooling mode and the double-cooling cooling mode can be performed as required based on a required volume of the air volume blown into the vehicle compartment similar to a case of using the temperature threshold.

(8) In the first embodiment, the first evaporator 18 and the second evaporator 20 are on the off-condition in the two-layer mode. However, for example, for a dehumidification, both of or one of the first evaporator 18 and the second evaporator 20 is put on an on-condition for cooling air. This is the same in the two-layer mode of the above-described embodiments except for the first embodiment.

(9) In the above-described embodiments, the first evaporator 18 and the second evaporator 20 constitute a single heat exchanger of which air passage is divided by a partition plate. However, the first evaporator 18 and the second evaporator 20 may be heat exchangers separated from each other. The same thing may be said of a relation between the first heater core 22 and the second heater core 24.

(10) In the fourth and fifth embodiments, the third inside-air introducing port 737 communicates with an inside of the vehicle compartment. However, in the vehicle compartment, for example, the third inside-air introducing port 737 may be piped such that inside air is introduced to the third inside-air introducing port 737 from around a driver seat. In this case, air conditioned in the double-cooling cooling mode can be circulated intensively around the driver seat, and a quick effect for cooling around the driver seat can be improved. The third inside-air intruding port 7373 corresponds to the air introducing port of the present disclosure.

(11) In the fourth and fifth embodiments, the third inside-air introducing port 737 communicates with an inside of the vehicle compartment. However, the third inside-air introducing port 737 may communicate with an outside of the vehicle compartment and may function as the outside-air introducing port.

(12) Although the third inside-air introducing port 737 is defined in the fourth and fifth embodiments, the third inside-air introducing port 737 may be omitted. In the double-cooling cooling mode shown in FIG. 7 in such a case, for example, the third blowing door 92 opens the third blowing outlet 736, and the first blower 14 such that air inside the vehicle compartment is introduced from the third blowing outlet 736 to the lower blower-housing portion 729. In this case, the first blower 14 can be operated to ventilate air to the lower ventilation passage 722 by using an axial-flow-type blower, not a centrifugal-type blower, as the first blower 14.

Figure 10:
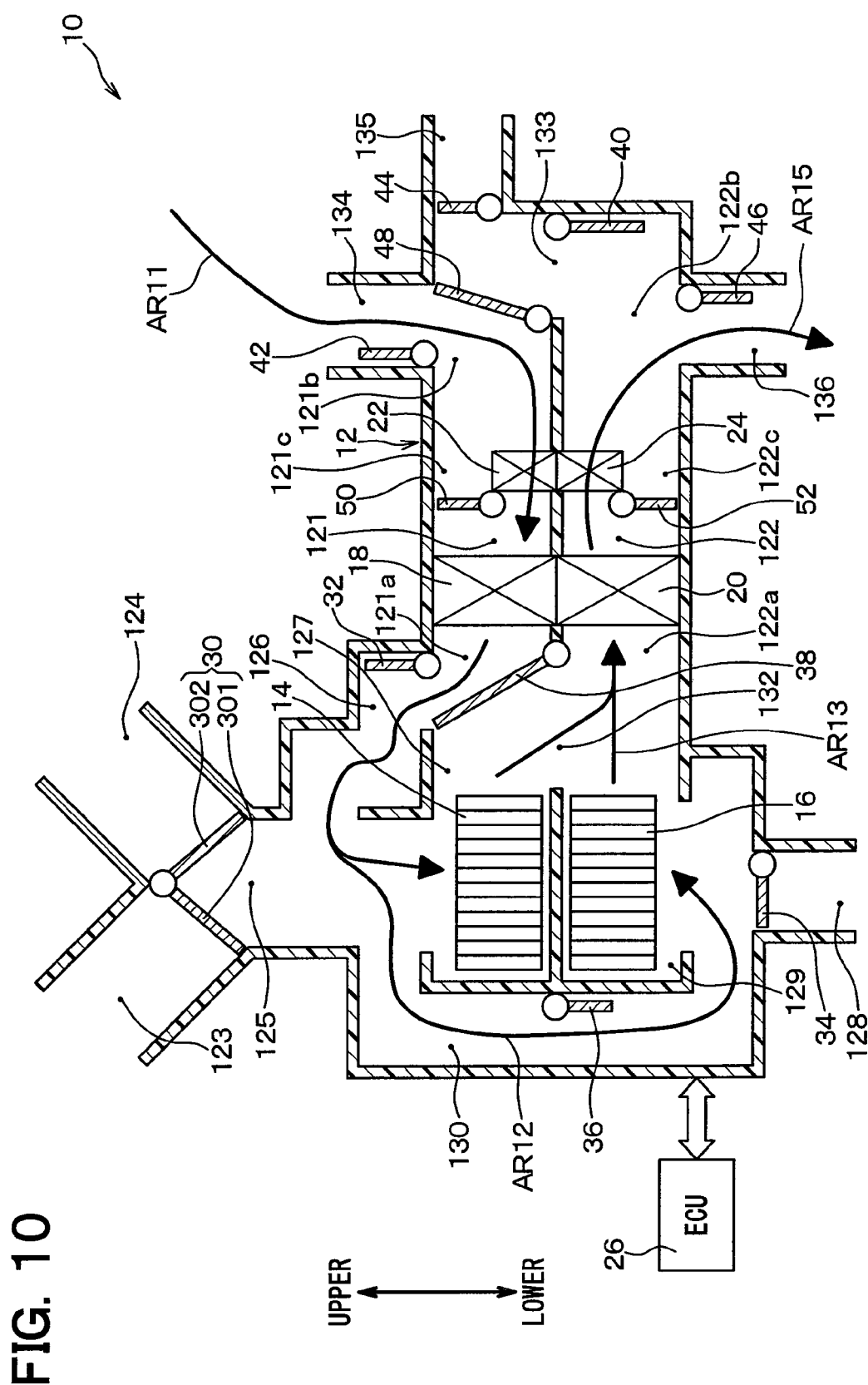
FIG. 10 is a diagram for explaining a modification example of the first embodiment and shows an example of an airflow when performing a heating operation by the air-conditioning unit 10 illustrated in FIG. 1.

(13) In FIG. 1 of the first embodiment, the first air-mix door 50 and the second air-mix door 52 are rotated to the max-cool position, and a cooling operation in which air flowing in the air-conditioning case 12 is cooled sequentially in the first evaporator 18 and the second evaporator 20. However, as shown in FIG. 10, the first air-mix door 50 and the second air-mix door 52 may be rotated to the max-hot position, and a heating operation in which air is heated sequentially in the first heater core 22 and the second heater core 24 may be performed. FIG. 10 is a diagram illustrating an example of an airflow when a heating operation is performed by the air-conditioning unit 10 illustrated in FIG. 1. In FIG. 10, the first heater core 22 corresponds to the first heat exchanger of the present disclosure, and the second heater core 24 corresponds to the second heat exchanger of the present disclosure.

In the heating operation shown in FIG. 10, the first evaporator 18 and the second evaporator 20 are put in an off-condition, for example. The air blowing outlet for the vehicle compartment is the third blowing outlet 136, not the second blowing outlet 135, and air flows from the third blowing outlet 136 into the vehicle compartment as shown by the arrow AR15. When the heating operation is performed as shown in FIG. 10, a temperature of air blown into the vehicle compartment can increase as compared to a case where the air is heated only once in the first heater core 22 or the second heater core 24 since air introduced into the air-conditioning case 12 is blown into the vehicle compartment after being heated twice in total in the heater cores 22, 24.

(14) Although the upper-lower direction of the air-conditioning case 12 is shown in FIG. 1 and the like in the above-described embodiments, a direction regarding the air-conditioning case 12 is not limited to the direction shown in the drawings.

(15) Although the inside-outside air door 94 is rotated to the first inside-outside air position to close the outside-air introducing port 723 and to open the first inside-air introducing port 724 in the double-cooling cooling mode of the fifth embodiment, it is not necessary to be limited to such an example. Although the inside-outside air door 94 may be preferable to be rotated to the first inside-outside air position of the inside-outside air door 94 in the double-cooling cooling mode, the inside-outside air door 94 may be rotated to the second inside-outside air position to open the outside-air introducing port 723 and close the first inside-air introducing port 724.

Such changes and modifications are to be understood as being within the scope of the present disclosure as defined by the appended claims. In the above-described embodiments, it is to be understood that elements constituting the embodiments are not necessary except for a case of being explicitly specified to be necessary and a case of being considered to be absolutely necessary in principle. Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, a positional relation of members, it is to be understood that such feature is not limited to a specific material, shape, positional relation, or the like except for a case of being explicitly specified to be necessary and a case of being considered to be absolutely necessary in principle.

What is claimed is:

1. A vehicular air-conditioning unit comprising:
    an air-conditioning case;
    a first ventilation passage and a second ventilation passage defined in parallel with each other in the air-conditioning case;
    a first communication-ventilation passage defined in the air-conditioning case, the first communication-ventilation passage through which one end of the first ventilation passage communicates with one end of the second ventilation passage;
    a first heat exchanger that is disposed in the first ventilation passage and heats or cools air flowing in the first ventilation passage between the one end and an other end of the first ventilation passage;
    a second heat exchanger that is disposed in the second ventilation passage and heats or cools air flowing in the second ventilation passage between the one end and an other end of the second ventilation passage; and
    a blowing mode switching device setting any one of blowing modes, wherein
    the blowing modes include:
        a first blowing mode (i) in which air is introduced from outside of the air-conditioning case to the one end of the first ventilation passage, the air flows from the one end to the other end of the first ventilation passage, and the air is blown into a vehicle compartment from the other end of the first ventilation passage, and (ii) in which air is introduced from outside of the air-conditioning case to the one end of the second ventilation passage, the air flows from the one end to the other end of the second ventilation passage, and the air is blown into the vehicle compartment from the other end of the second ventilation passage; and
        a second blowing mode in which (i) air is introduced from outside of the air-conditioning case to the other end of the first ventilation passage, (ii) the air flows from the other end to the one end of the first ventilation passage and flows to the one end of the second ventilation passage through the first communication-ventilation passage, (iii) the air flowing to the one end of the second ventilation passage flows from the one end of the second ventilation passage to the other end of the second ventilation passage, and (iv) the air is blown from the other end of the second ventilation passage into the vehicle compartment.

2. The vehicular air-conditioning unit according to claim 1, further comprising
    a first blower and a second blower blowing air, wherein
    the air-conditioning case has:
        an air introducing portion introducing air from outside of the air-conditioning case;
        a first-blower housing portion housing the first blower;
        a second-blower housing portion housing the second blower;
        a second communication-ventilation passage through which the first-blower housing portion communicates with the one end of the second ventilation passage; and
        a circular ventilation passage through which the one end of the first ventilation passage communicates with the air introducing portion,
    the first communication-ventilation passage is (i) connected to the one end of the first ventilation passage through the circular ventilation passage at one end of the first communication-ventilation passage and (ii) connected to the one end of the second ventilation passage through the second-blower housing portion at an other end of the first communication-ventilation passage, and
    the blowing mode switching device:
        in the first blowing mode, (i) closes the circular ventilation passage and the second communication-ventilation passage and (ii) introduces air, which is introduced from outside of the air-conditioning case through the air introducing portion, to be blown to the one end of the first ventilation passage by the first blower and to be blown to the one end of the second ventilation passage by the second blower; and
        in the second blowing mode, (i) blocks air that is introduced from outside of the air-conditioning case through the air introducing portion, (ii) opens the circular ventilation passage and the second communication-ventilation passage, and (iii) introduces air, which flows from the other end to the one end of the first ventilation passage, to be blown to the one end of the second ventilation passage through the circular ventilation passage and the second communication-ventilation passage by the first blower and to be blown to the one end of the second ventilation passage through the circular ventilation passage and the first communication-ventilation passage by the second blower.

3. The vehicular air-conditioning unit according to claim 2, wherein
the blowing mode switching device includes a switching portion alternatively set between the first ventilation passage and the second ventilation passage as a target to which the first blower blows air.

4. The vehicular air-conditioning unit according to claim 1, further comprising
a first blower and a second blower blowing air, wherein
the air-conditioning case has:
an air introducing portion introducing air from outside of the air-conditioning case;
a first-blower housing portion housing the first blower; and
a second-blower housing portion housing the second blower,
the first communication-ventilation passage is (i) connected to the one end of the first ventilation passage through the first-blower housing portion at one end of the first communication-ventilation passage and (ii) connected to the one end of the second ventilation passage through the second-blower housing portion at an other end of the first communication-ventilation passage, and
the blowing mode switching device:
in the first blowing mode, introduces air, which is introduced from outside of the air-conditioning case through the air introducing portion, to be blown to the one end of the first ventilation passage by the first blower and to be blown to the one end of the second ventilation passage by the second blower; and
in the second blowing mode, (i) blocks air that is introduced from outside of the air-conditioning case through the air introducing portion and (ii) introduces air, which flows from the other end to the one end of the first ventilation passage, to be blown to the one end of the second ventilation passage through the first communication-ventilation passage by both the first blower and the second blower or by the second blower.

5. The vehicular air-conditioning unit according to claim 1, further comprising
a blower blowing air, wherein
the blowing mode switching device includes a switching portion switching a target to which the blower blows air,
the air-conditioning case has:
an air introducing portion introducing air from outside of the air-conditioning case; and
a blower housing portion housing the blower,
the first communication-ventilation passage is (i) connected to the one end of the first ventilation passage and the air introducing portion at one end of the first communication-ventilation passage and (ii) connected to the one end of the second ventilation passage through the blower housing portion at an other end of the first communication-ventilation passage,
the switching portion is switched between (i) a first switching position that disallows air to be blown to the first ventilation passage by the blower, allows air to be blown to the second ventilation passage by the blower, and opens the first ventilation passage to the first communication-ventilation passage and (ii) a second switching position that allows air to be blown to both the first ventilation passage and the second ventilation passage by the blower and blocks a communication between the first ventilation passage and the first communication-ventilation passage, and
the blowing mode switching device:
in the first blowing mode, (i) sets the switching portion to the second switching position and (ii) introduces air, which is introduced from outside of the air-conditioning case through the air introducing portion, to be blown to both the one end of the first ventilation passage and the one end of the second ventilation passage by the blower; and
in the second blowing mode, (i) sets the switching portion to the first switching position, (ii) blocks air that is introduced from outside of the air-conditioning case through the air introducing portion, and (iii) introduces air, which flows from the other end to the one end of the first ventilation passage, to be blown to the one end of the second ventilation passage by the blower through the first communication-ventilation passage.

6. The vehicular air-conditioning unit according to claim 1, wherein
the air-conditioning case has an air outlet from which air is blown into the vehicle compartment in any one of the blowing modes except for the second blowing mode, and
the blowing mode switching device introduces air from the vehicle compartment to the other end of the first ventilation passage through the air outlet in the second blowing mode.

7. The vehicular air-conditioning unit according to claim 1, wherein
the air-conditioning case has a defroster outlet, a face outlet, and a foot outlet, and
in the second blowing mode, the blowing mode switching device (i) introduces air from the vehicle compartment to the other end of the first ventilation passage through the defroster outlet and (ii) introduces air that is in the air-conditioning unit to be blown to the vehicle compartment from the face outlet or the foot outlet through the other end of the second ventilation passage.

8. The vehicular air-conditioning unit according to claim 1, further comprising:
a first blower that draws air from outside of the air-conditioning case and blows the air to the other end of the first ventilation passage or that draws air from the other end of the first ventilation passage and blows the air into the vehicle compartment;
a second blower that draws air from the other end of the second ventilation passage and blows the air into the vehicle compartment; and
an air introducing portion that is defined in the air-conditioning case and introduces air from outside of the air-conditioning case to both the one end of the first ventilation passage and the one end of the second ventilation passage, wherein
the blowing mode switching device:
in the first blowing mode, introduces air, which is introduced from outside of the air-conditioning case through the air introducing portion, to be drawn into the first blower after flowing from the one end to the other end of the first ventilation passage and to be drawn into the second blower after flowing from the one end to the other end of the second ventilation passage; and in the second blowing mode, introduces air to be drawn into the first blower from outside of the air-conditioning case and to be blown to the other end of the first ventilation passage by the first blower and introduces air to be drawn into the second blower from the other end of the second ventilation passage and to be blown into the vehicle compartment by the second blower.

9. The vehicular air-conditioning unit according to claim 8, wherein
the air introducing portion has an outside-air introducing port that communicates with outside of the vehicle compartment and an inside-air introducing port that communicates with inside of the vehicle compartment,
the blowing mode switching device includes an introducing-port switching portion that opens one of the outside-air introducing port and the inside-air introducing port and closes the other one of the outside-air introducing port and the inside-air introducing port, and
in the second blowing mode, the blowing mode switching device closes one of the outside-air introducing port and the inside-air introducing port by the introducing-port switching portion and increases an air volume blown by the second blower to be larger than an air volume blown by the first blower.

10. The vehicular air-conditioning unit according to claim 8, wherein
the air conditioning case has a defroster outlet, a face outlet, and an air introducing port introducing air from around a driver seat in the vehicle compartment into the air-conditioning case, and
in the second blowing mode, the blowing mode switching device (i) introduces air to be drawn into the first blower from around the driver seat through the air introducing port and (ii) introduces air to be drawn into the second blower from the other end of the second ventilation passage and to be blown into the vehicle compartment through the defroster outlet and the face outlet by the second blower.

11. The vehicular air-conditioning unit according to claim 1, wherein
both the first heat exchanger and the second heat exchanger are a cooling heat exchanger, and
the blowing mode switching device sets the first blowing mode when a temperature in the vehicle compartment is higher than or equal to a predetermined threshold temperature.

12. The vehicular air-conditioning unit according to claim 11, wherein
the blowing mode switching device sets the second blowing mode when a temperature in the vehicle compartment is lower than the predetermined threshold temperature.

13. The vehicular air-conditioning unit according to claim 1, wherein
the blowing mode switching device sets the first blowing mode to increase an air volume that is blown into the vehicle compartment to be larger than that in the second blowing mode.

* * * * *